United States Patent
Ishibashi

(10) Patent No.: US 11,201,984 B2
(45) Date of Patent: Dec. 14, 2021

(54) COMPUTER-READABLE STORAGE MEDIUM AND INFORMATION PROCESSING APPARATUS

(71) Applicant: BROTHER KOGYO KABUSHIKI KAISHA, Nagoya (JP)

(72) Inventor: Masayuki Ishibashi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/983,109

(22) Filed: Aug. 3, 2020

(65) Prior Publication Data

US 2021/0044719 A1    Feb. 11, 2021

(30) Foreign Application Priority Data

Aug. 5, 2019  (JP) ............... JP2019-143680

(51) Int. Cl.
*H04N 1/387* (2006.01)
*H04N 1/00* (2006.01)

(52) U.S. Cl.
CPC ......... *H04N 1/387* (2013.01); *H04N 1/0057* (2013.01); *H04N 1/0071* (2013.01); *H04N 1/00456* (2013.01)

(58) Field of Classification Search
None
See application file for complete search history.

(56) References Cited

U.S. PATENT DOCUMENTS

| 10,956,103 B2* | 3/2021 | Hori | G06F 3/1205 |
| 2011/0242559 A1* | 10/2011 | Takeuchi | H04N 1/2307 |
| | | | 358/1.9 |
| 2015/0212771 A1* | 7/2015 | Hori | G06F 3/1242 |
| | | | 358/1.18 |

FOREIGN PATENT DOCUMENTS

JP    2015-138505 A    7/2015

* cited by examiner

*Primary Examiner* — Miya J Williams
(74) *Attorney, Agent, or Firm* — Kenealy Vaidya LLP

(57) ABSTRACT

A non-transitory computer-readable storage medium storing computer-readable instructions for an information processing apparatus is provided. The computer-readable instructions cause the information processing apparatus to obtain a width of an image-formable area, having a first side and a second side, on a sheet and object image data composing an object image; define a first partial image and a second partial image in the object image; and generate composite image data composing an image, in which the first partial image and the second partial image are arrayed in an arrangement such that a third side of the first partial image and a fourth side of the second partial image align along the first direction.

21 Claims, 25 Drawing Sheets

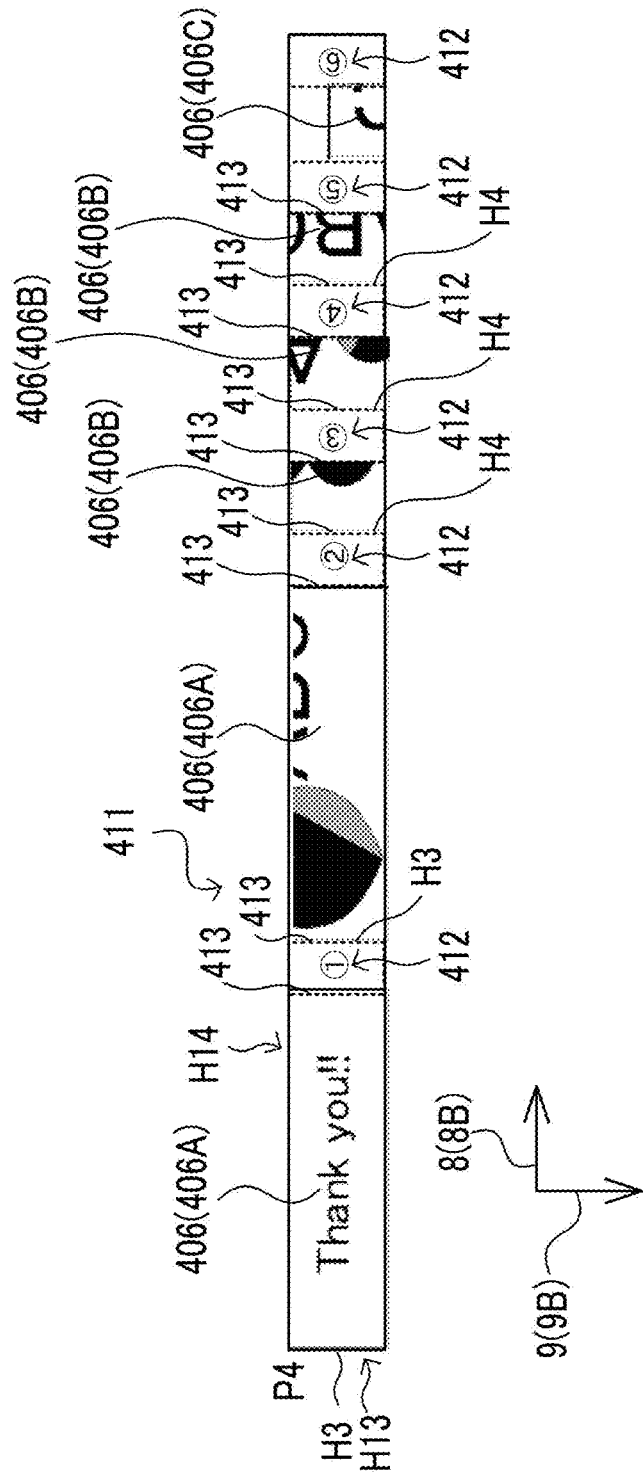

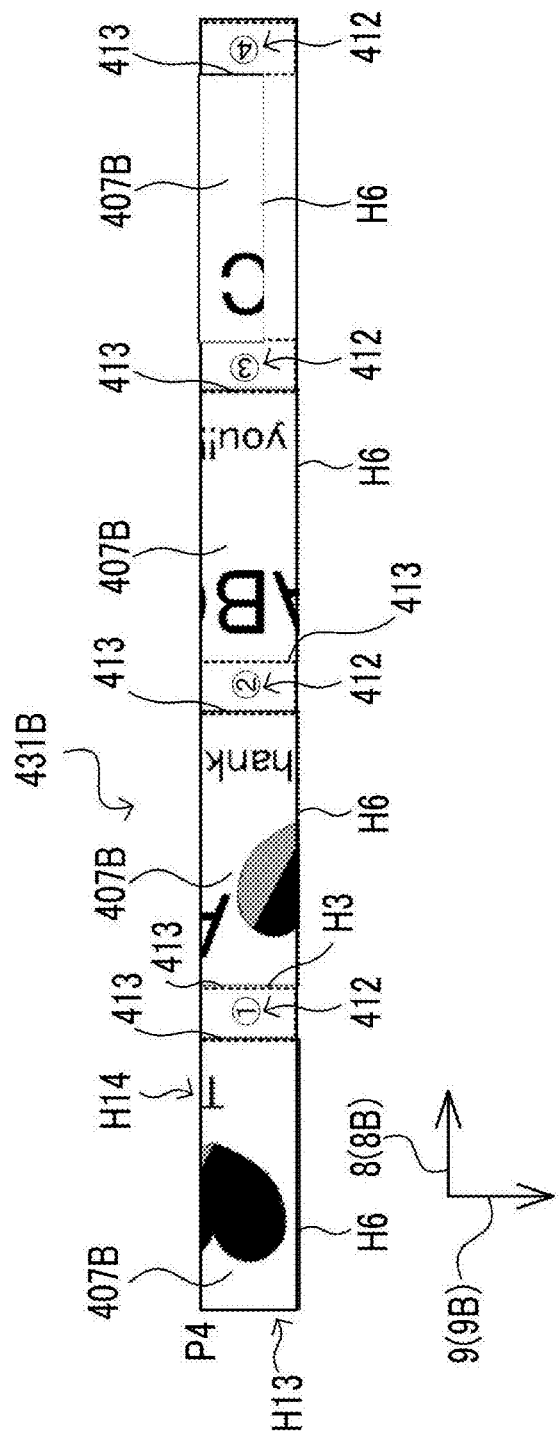

COMPUTER-READABLE STORAGE MEDIUM AND INFORMATION PROCESSING APPARATUS

CROSS REFERENCE TO RELATED DATA

Figure 1:
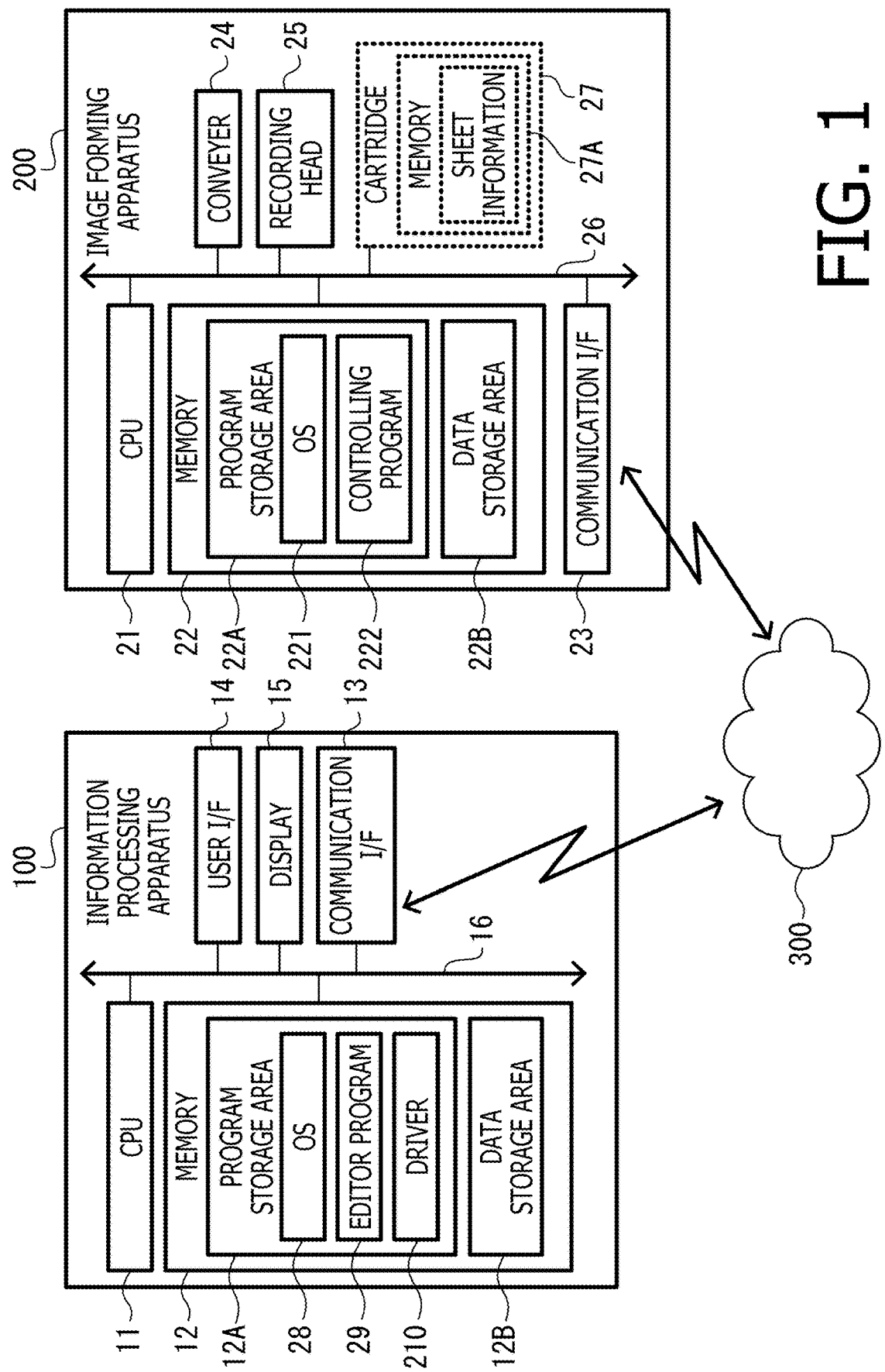

This application claims priority from Japanese Patent Application No. 2019-143680, filed on Aug. 5, 2019, the entire subject matter of which is incorporated herein by reference.

BACKGROUND

Technical Field

An aspect of the present disclosure is related to a computer-readable storage medium and an information processing apparatus.

Related Art

A print-controlling apparatus capable of printing posters is known. In order to form a larger original image, the print-controlling apparatus may divide the original image into a plurality of smaller partial images and place the partial images together. Sizes of the partial images may be determined based on a size of a sheet, on which the partial images are to be printed.

SUMMARY

The print-controlling apparatus may divide the original image into the plurality of smaller parts along a single direction, e.g., a widthwise direction, of the original image, and print the smaller parts on the sheet. As the plurality of partial images are printed one by one on the sheet, the parts of the sheet, on which the partial image are printed, may contain blank areas, in which no image is printed.

The present disclosure is advantageous in that a computer readable storage medium storing computer readable instructions, which may control an information processing apparatus to efficiently generate partial images, and an information processing apparatus are provided.

According to an aspect of the present disclosure, a non-transitory computer-readable storage medium storing computer-readable instructions for an information processing apparatus is provided. The computer-readable instructions, when executed by a processor of the information processing apparatus, cause the information processing apparatus to perform obtaining a width of an image-formable area, in which an image is formable on a sheet, the image-formable area being in a rectangular shape having a first side extending along a first direction and a second side extending along a second direction, the second direction intersecting orthogonally with the first direction, the width being a size of the first side, and object image data composing an object image containing an object, the object image having a size larger than the width in a widthwise direction corresponding to the first direction and in a lengthwise direction corresponding to the second direction; defining a first partial image and a second partial image in the object image, the first partial image and the second partial image each having a rectangular shape, the first partial image having a third side, the third side extending along the widthwise direction, a size of the third side being at most equal to the width, the second partial image having a fourth side, the fourth side extending along the lengthwise direction, a size of the fourth side being at most equal to the width; and generating composite image data composing an image, in which the first partial image and the second partial image are arrayed in an arrangement such that the third side of the first partial image and the fourth side of the second partial image align along the first direction.

According to another aspect of the present disclosure, a non-transitory computer-readable storage medium storing computer-readable instructions for an information processing apparatus is provided. The computer-readable instructions, when executed by a processor of the information processing apparatus, cause the information processing apparatus to perform obtaining a width of an image-formable area, in which an image is formable on a sheet, the image-formable area being in a rectangular shape having a first side extending along a first direction and a second side extending along a second direction, the second direction intersecting orthogonally with the first direction, the width being a size of the first side, and object image data composing an object image containing an object, the object image having a size larger than the width in a widthwise direction corresponding to the first direction and in a lengthwise direction corresponding to the second direction; defining a plurality of first partial images in the object image, each of the plurality of first partial images having a rectangular shape and having a third side, the third side extending along the widthwise direction, a size of the third side being at most equal to the width; defining a plurality of second partial images in the object image, each of the plurality of second partial images having a rectangular shape and having a fourth side, the fourth side extending along the lengthwise direction, a size of the fourth side being at most equal to the width; selecting one of the plurality of first partial images and the plurality of second partial images; and outputting one of first composite image data composing a first image corresponding to the plurality of first partial images and second composite image data composing a second image corresponding to the plurality of second partial images based on the selection between the plurality of first partial images and the plurality of second partial images.

According to another aspect of the present disclosure, an information processing apparatus, an information processing apparatus, having a communication interface and a controller, is provided. The controller is configured to obtain a width of an image-formable area, in which an image is formable on a sheet, the image-formable area being in a rectangular shape having a first side extending along a first direction and a second side extending along a second direction, the second direction intersecting orthogonally with the first direction, the width being a size of the first side, and object image data composing an object image containing an object, the object image having a size larger than the width in a widthwise direction corresponding to the first direction and in a lengthwise direction corresponding to the second direction; define a first partial image and a second partial image in the object image, the first partial image and the second partial image each having a rectangular shape, the first partial image having a third side, the third side extending along the widthwise direction, a size of the third side being at most equal to the width, the second partial image having a fourth side, the fourth side extending along the lengthwise direction, a size of the fourth side being at most equal to the width; generate composite image data composing an image, in which the first partial image and the second partial image are arrayed in an arrangement such that the third side of the first partial image and the fourth side of the second partial image align along the first direction; and transmit a command to execute image-forming based on the composite image externally through the communication interface.

According to another aspect of the present disclosure, an information processing apparatus, having a communication interface and a controller, is provided. The controller is configured to obtain a width of an image-formable area, in which an image is formable on a sheet, the image-formable area being in a rectangular shape having a first side extending along a first direction and a second side extending along a second direction, the second direction intersecting orthogonally with the first direction, the width being a size of the first side, and object image data composing an object image containing an object, the object image having a size larger than the width in a widthwise direction corresponding to the first direction and in a lengthwise direction corresponding to the second direction; define a plurality of first partial images in the object image, each of the plurality of first partial images having a rectangular shape and having a third side, the third side extending along the widthwise direction, a size of the third side being at most equal to the width; define a plurality of second partial images in the object image, each of the plurality of second partial images having a rectangular shape and having a fourth side, the fourth side extending along the lengthwise direction, a size of the fourth side being at most equal to the width; select one of the plurality of first partial images and the plurality of second partial images; output one of first composite image data composing a first image corresponding to the first partial images and second composite image data composing a second image corresponding to the plurality of second partial images based on the selection between the plurality of first partial images and the plurality of second partial images; and transmit a command to execute image-forming based on the selected one of the first composite image data and the second composite image data externally through the communication interface.

BRIEF DESCRIPTION OF THE ACCOMPANYING DRAWINGS

FIG. 1 is a block diagram to illustrate configurations of an information processing apparatus 100 and an image forming apparatus 200 according to embodiments of the present disclosure.

Figure 2A:
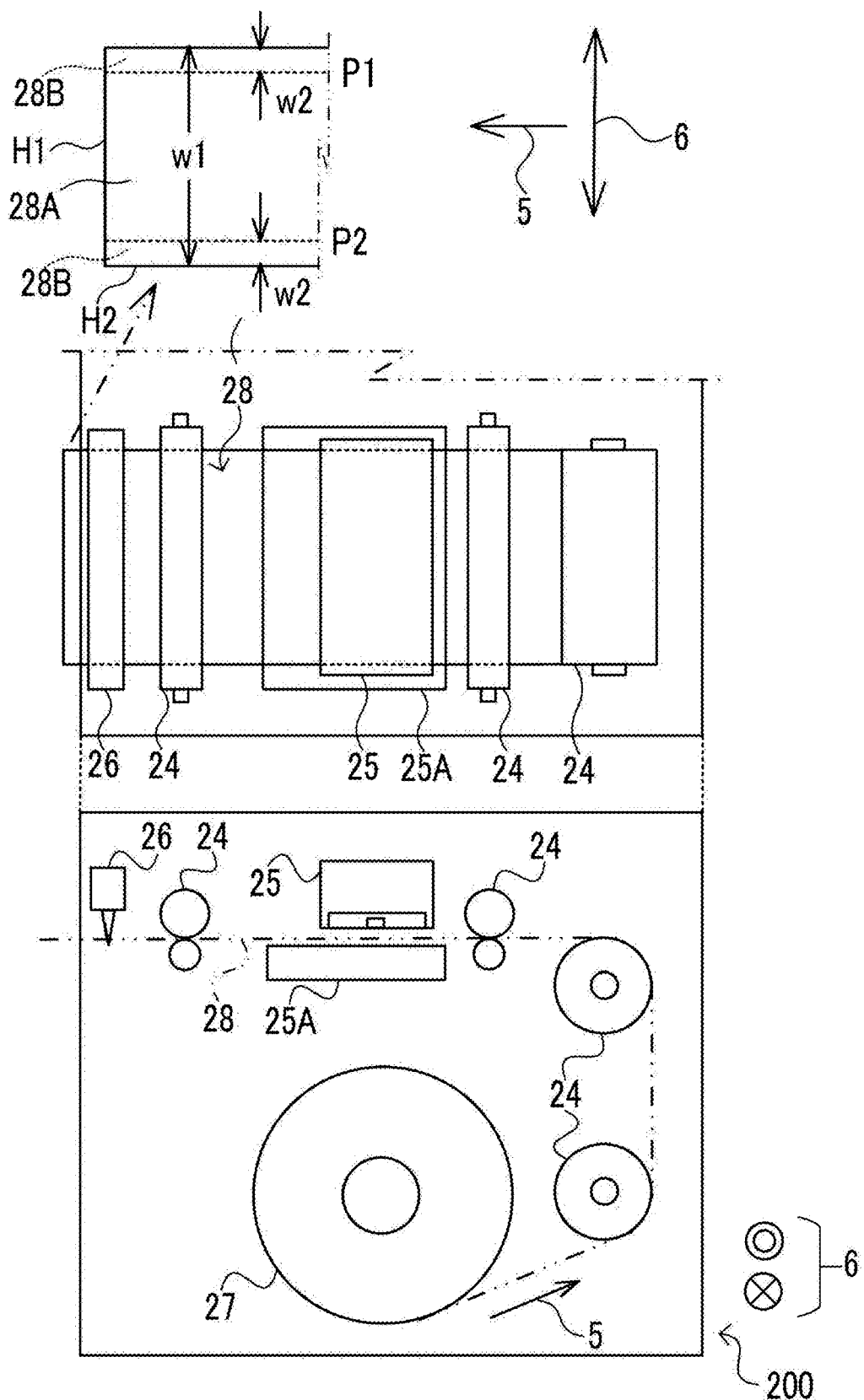
Figure 2B:
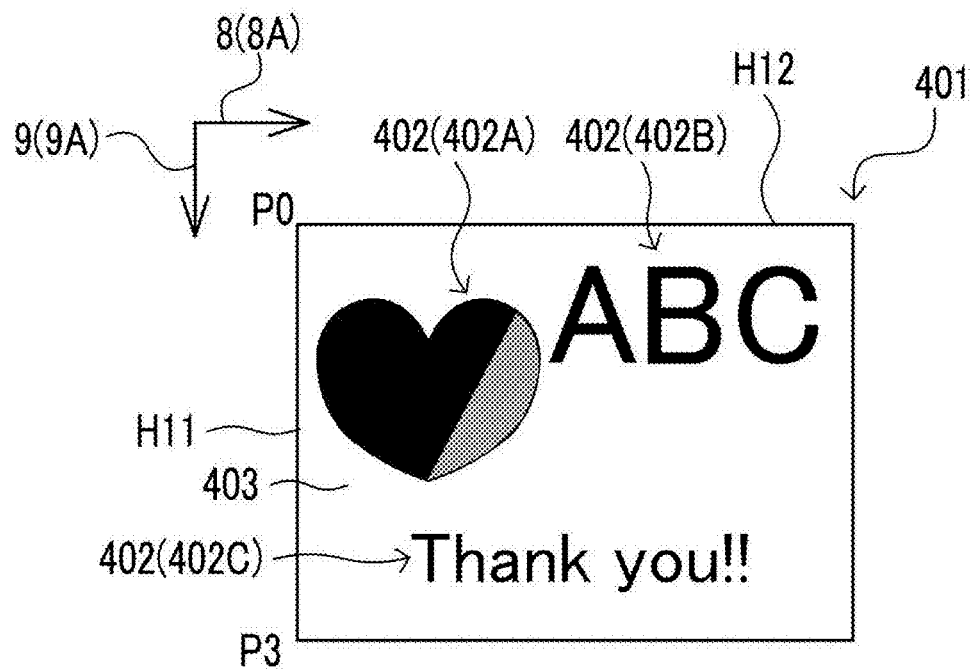
Figure 2C:
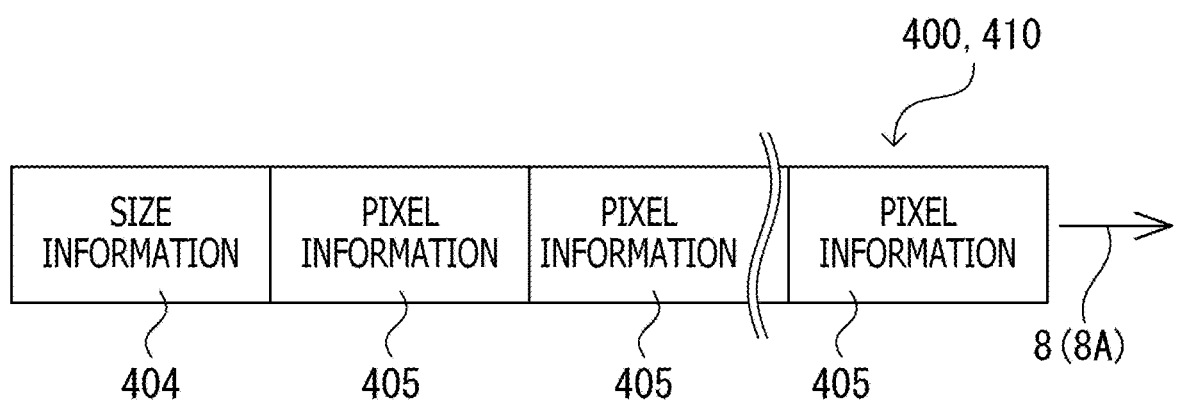

FIG. 2A is an illustrative view of an internal configuration of the image forming apparatus 200 according to the embodiments of the present disclosure. FIG. 2B is an illustrative view of an object image based on a unit of object image data 401 according to the embodiments of the present disclosure. FIG. 2C is an illustrative view of data structures of the unit of object image data 400 and a unit of composite image data 410 according to the embodiments of the present disclosure.

Figure 3A:
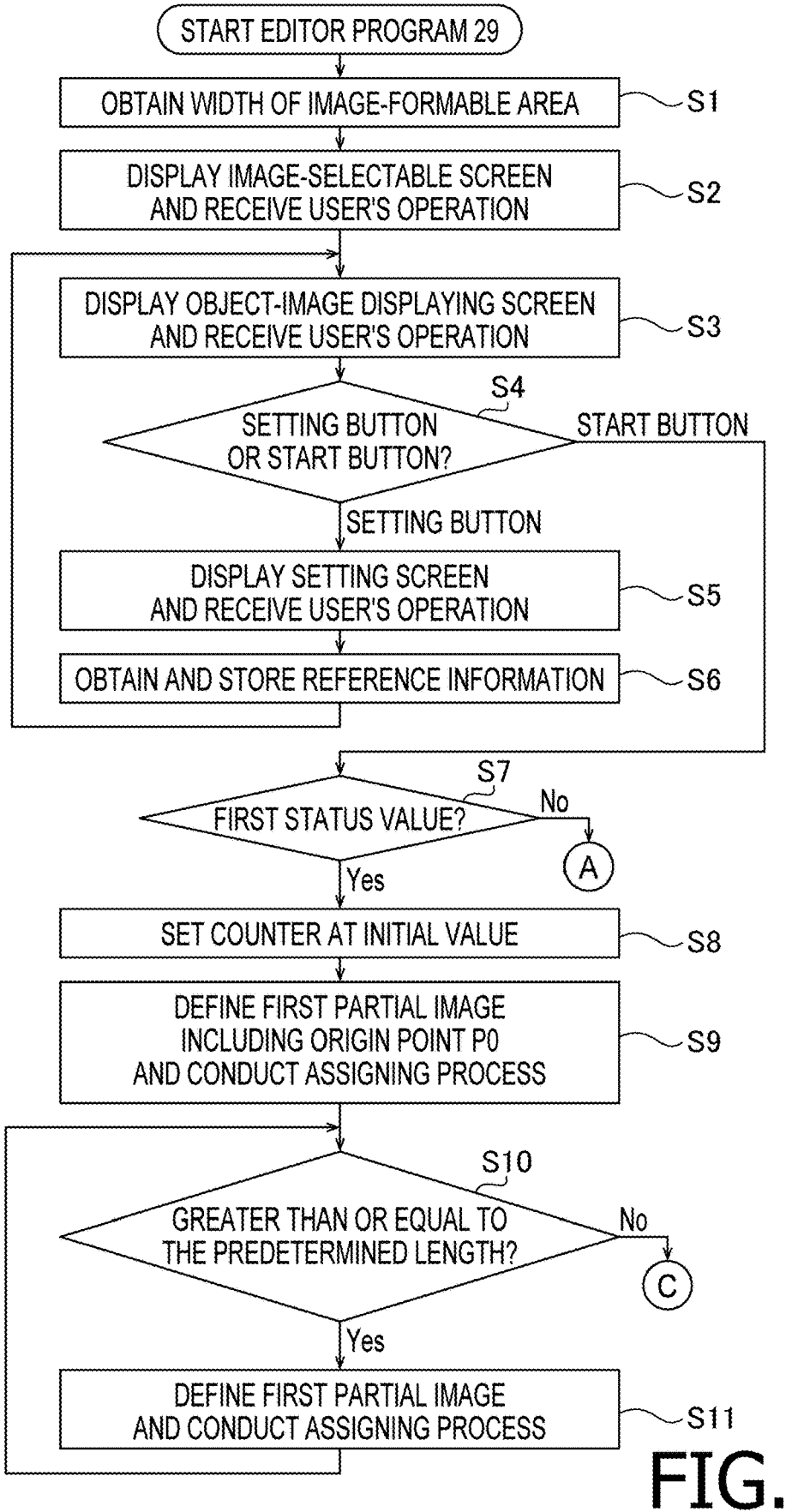
Figure 3B:
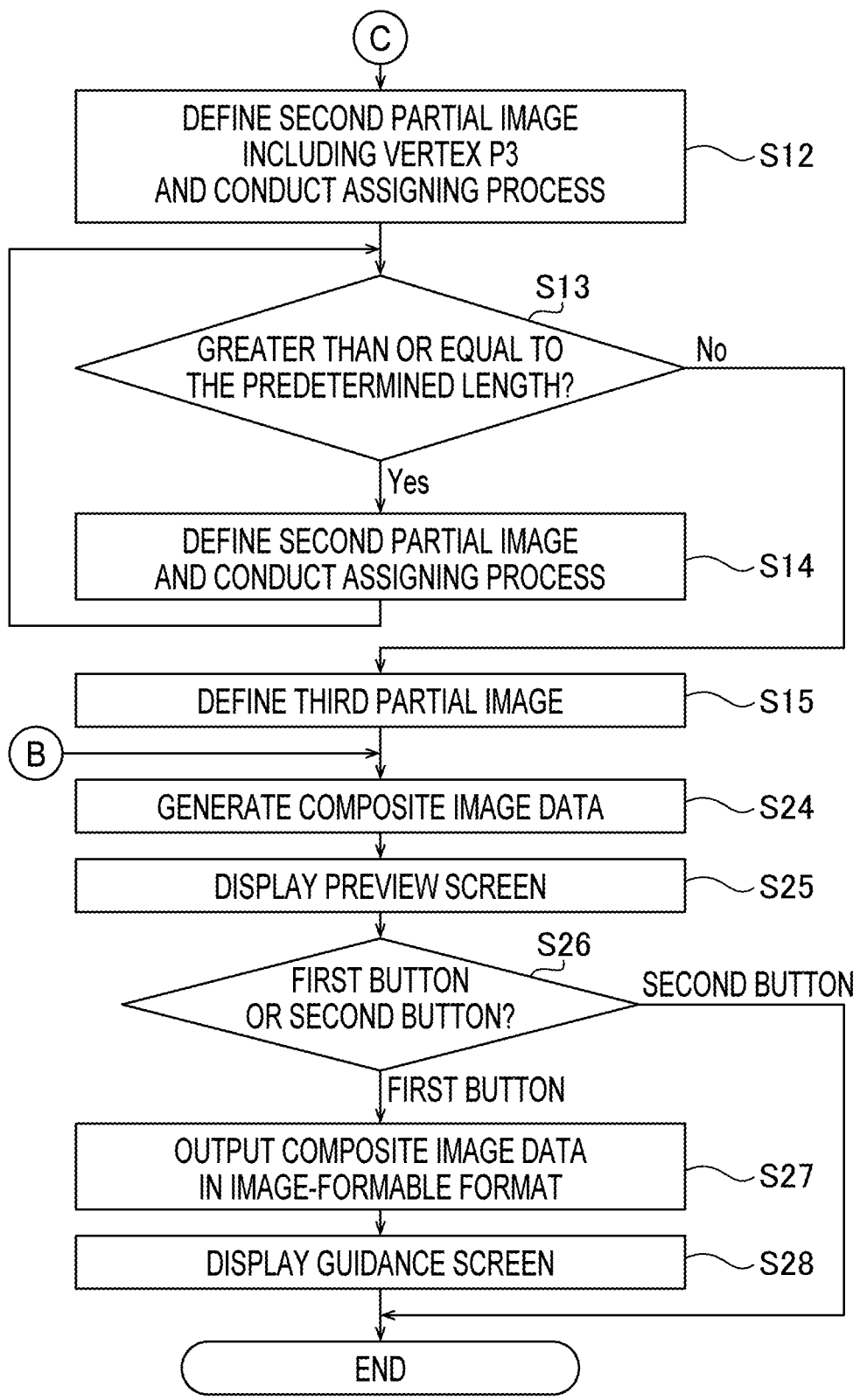
Figure 3C:
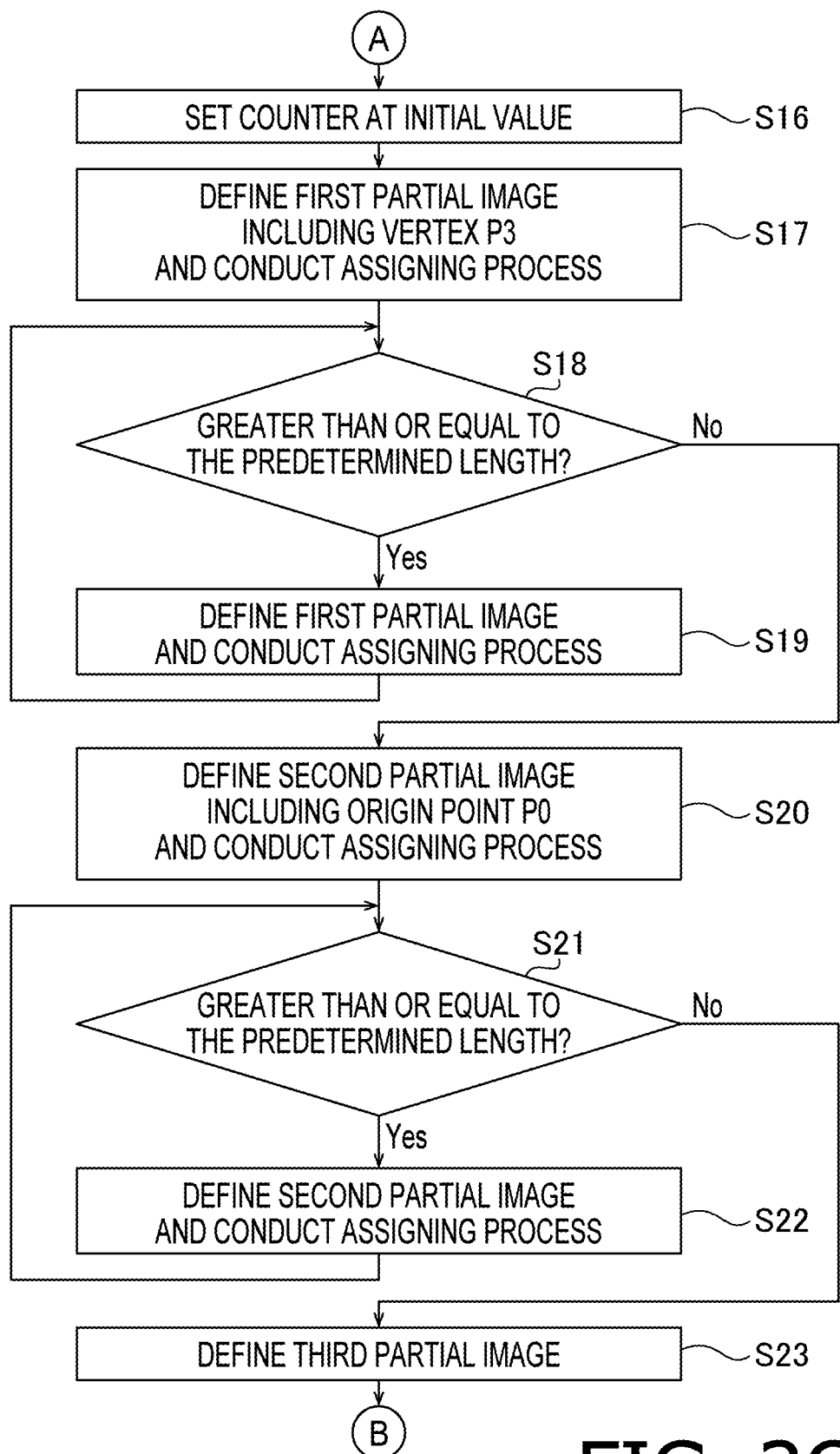

FIGS. 3A-3C are flowcharts to illustrate flows of steps to be executed by an editor program 29 in the information processing apparatus 100 according to a first embodiment of the present disclosure.

Figure 4A:
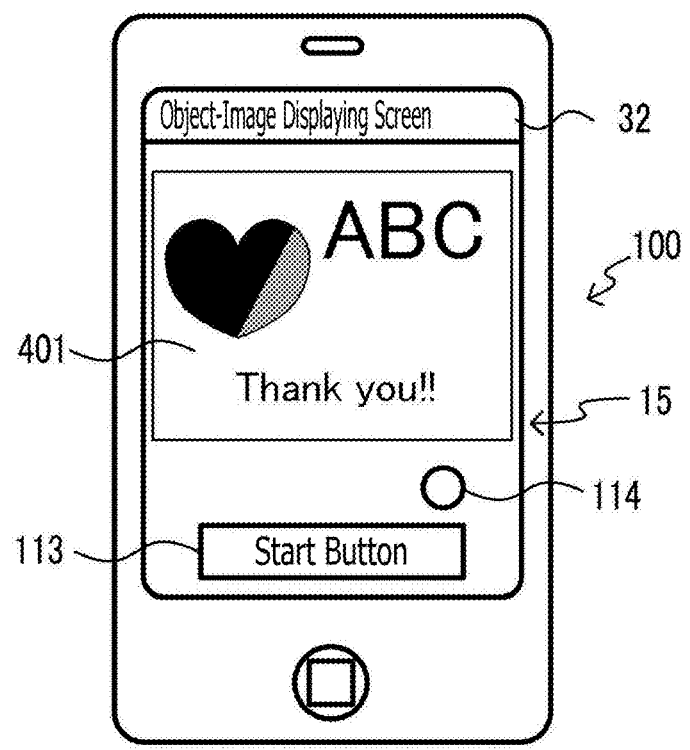
Figure 4B:
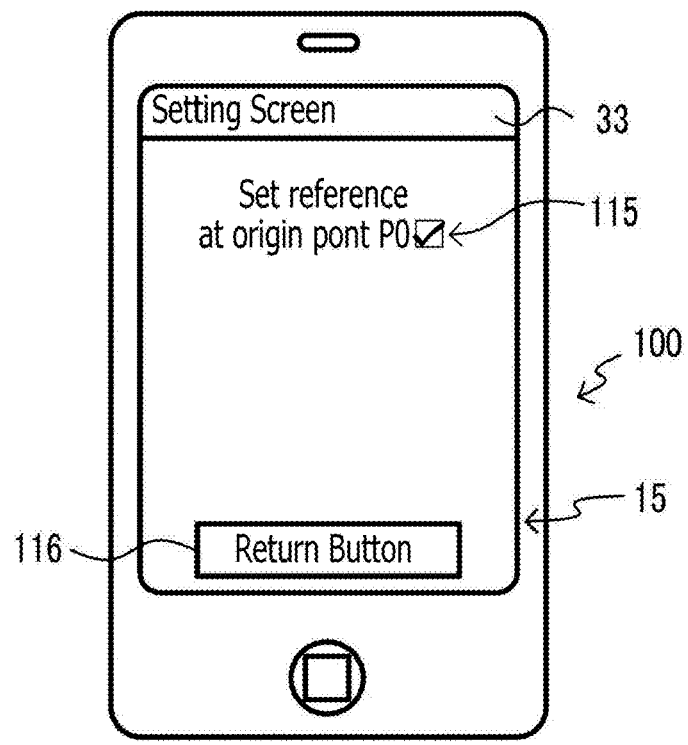
Figure 4C:
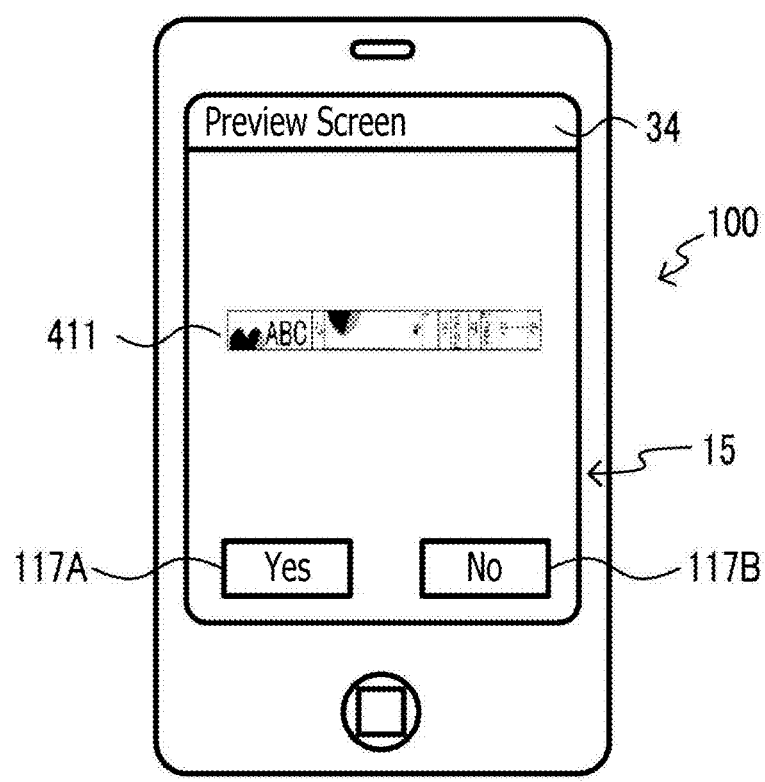

FIGS. 4A-4C are illustrative views of an object-image displaying screen 32, a setting screen 33, and a preview screen 34, respectively, to be displayed in a display 15 in the information processing apparatus 100 according to the first embodiment of the present disclosure.

Figure 5A:
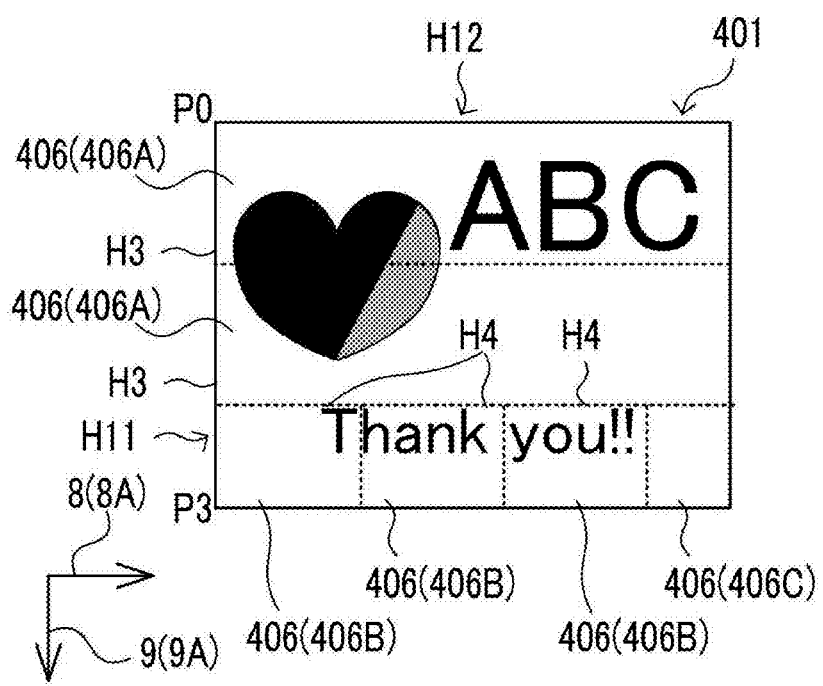
Figure 5B:
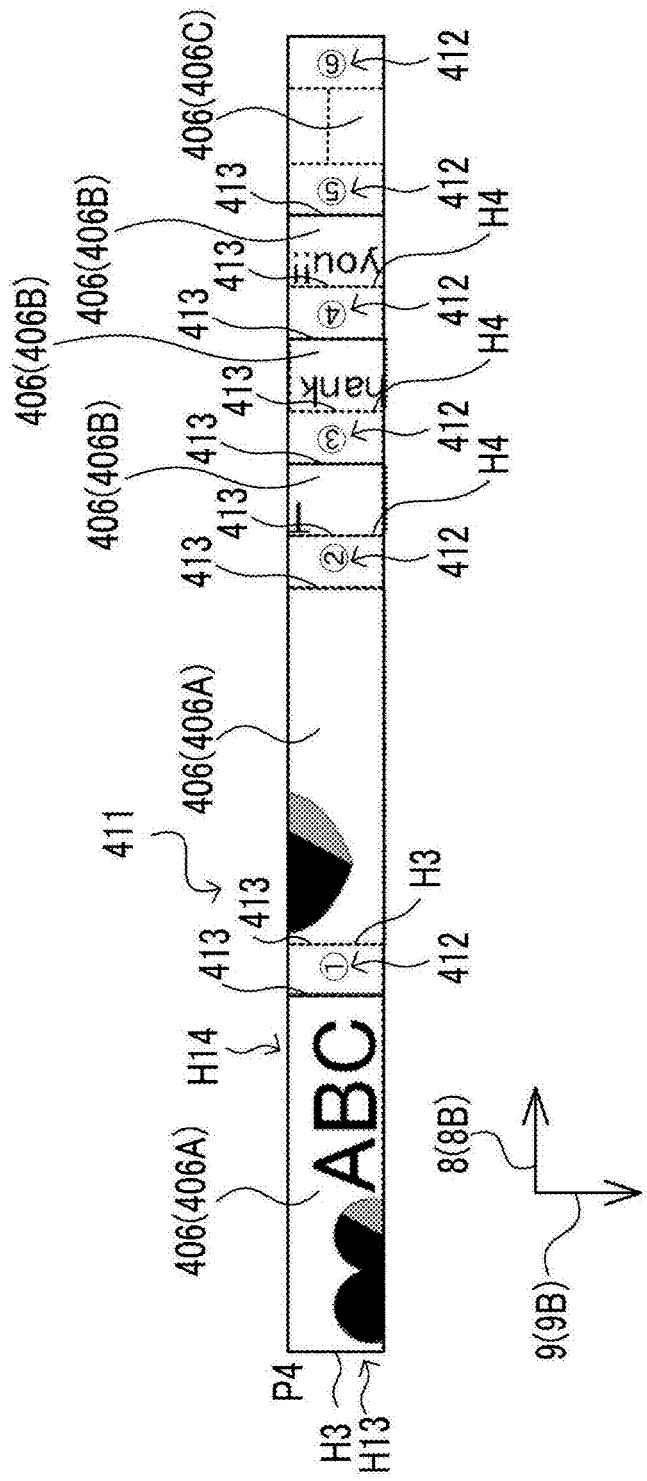
Figure 5C:
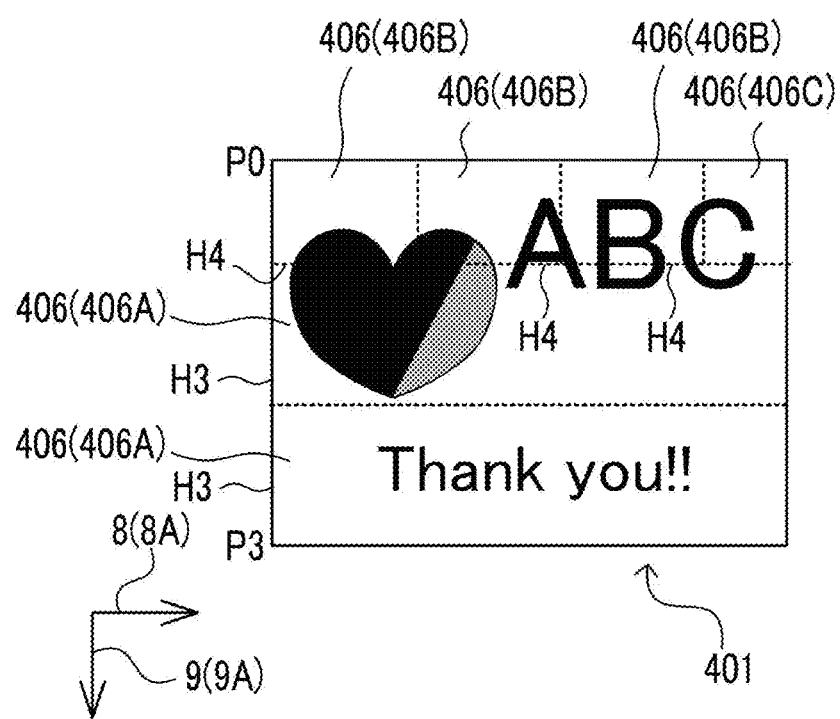

FIG. 5A is an illustrative view of an arrangement of first through third partial images 406A-406C composed of the unit of object image data 401 to be arranged by an editor program 29 according to the first embodiment of the present disclosure. FIG. 5B is an illustrative view of a composite image 411 to be generated by the editor program 29 according to the first embodiment of the present disclosure. FIG. 5C is an illustrative view of another arrangement of the first through third partial images 406A-406C composed of the unit of object image data 401 to be arranged by the editor program according to the first embodiment of the present disclosure. FIG. 5D is an illustrative view of another composite image 411 to be generated by the editor program 29 according to the first embodiment of the present disclosure.

Figure 6:
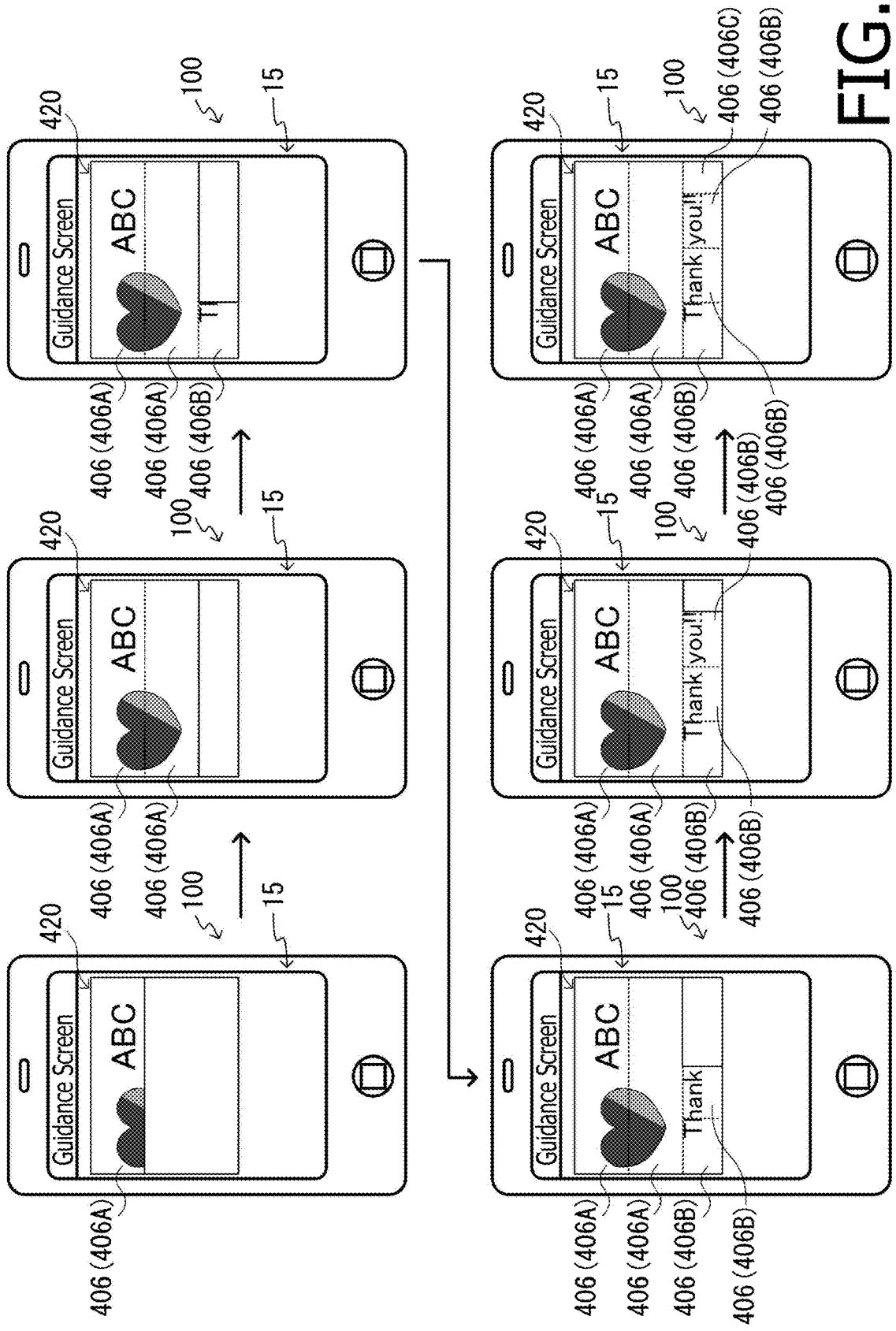

FIG. 6 is an illustrative view of a guidance screen 420 to be displayed in the display 15 in the information processing apparatus 100 according to the first embodiment of the present disclosure.

Figure 7A:
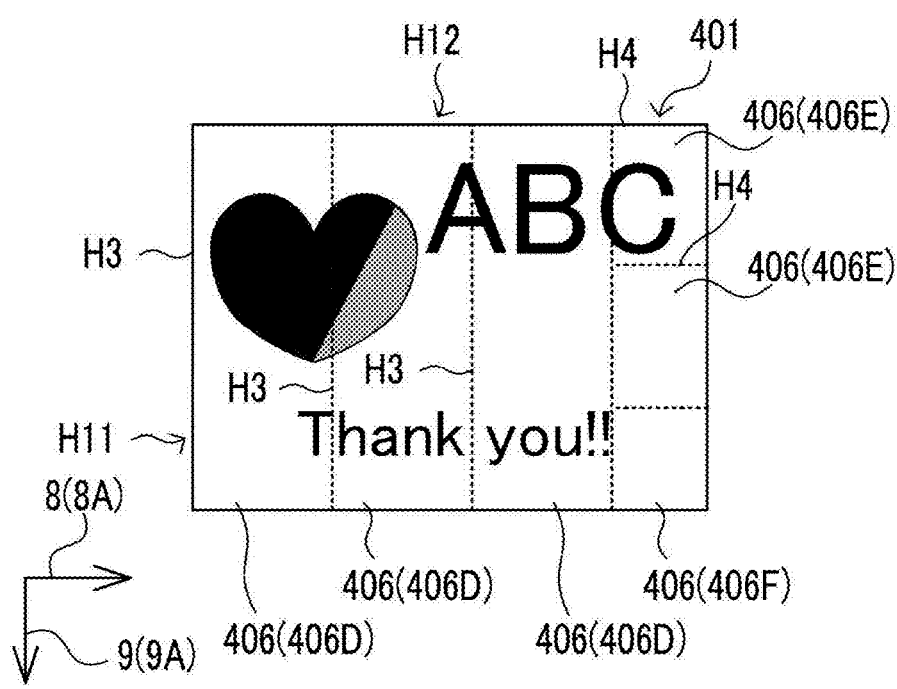
Figure 7B:
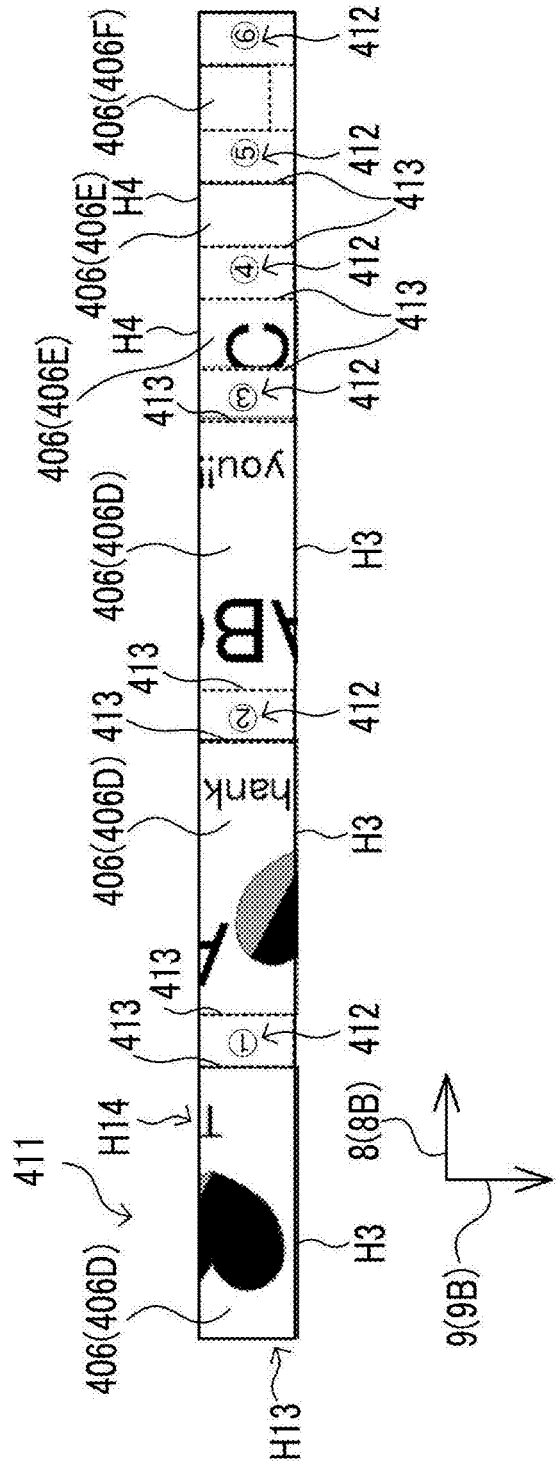

FIG. 7A is an illustrative view of another arrangement of first through third partial images 406D-406F composed of the unit of object image data 401 to be arranged by the editor program according to the first embodiment of the present disclosure. FIG. 7B is an illustrative view of another composite image 411 to be generated by the editor program 29 according to the first embodiment of the present disclosure.

Figure 8A:
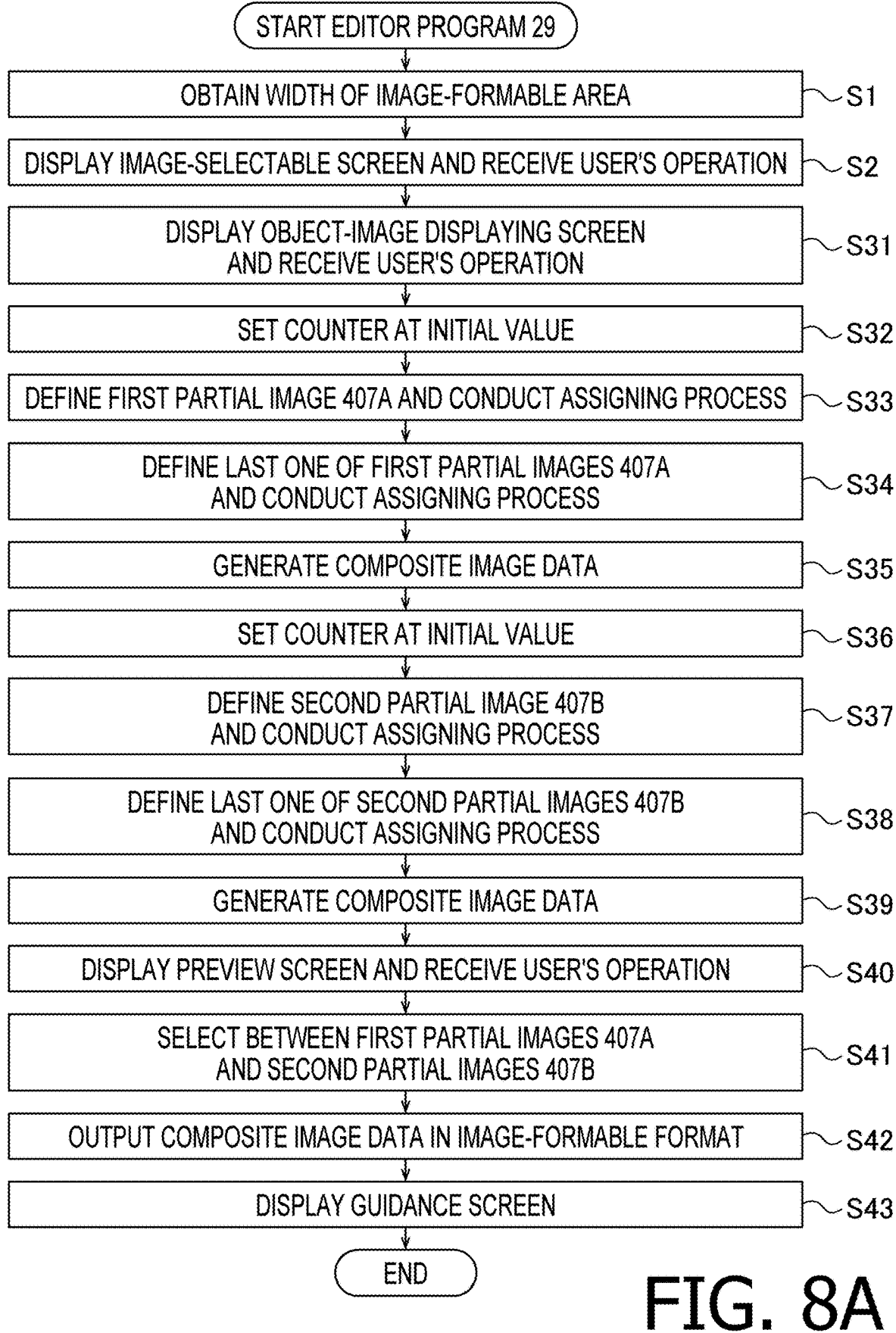
Figure 8B:
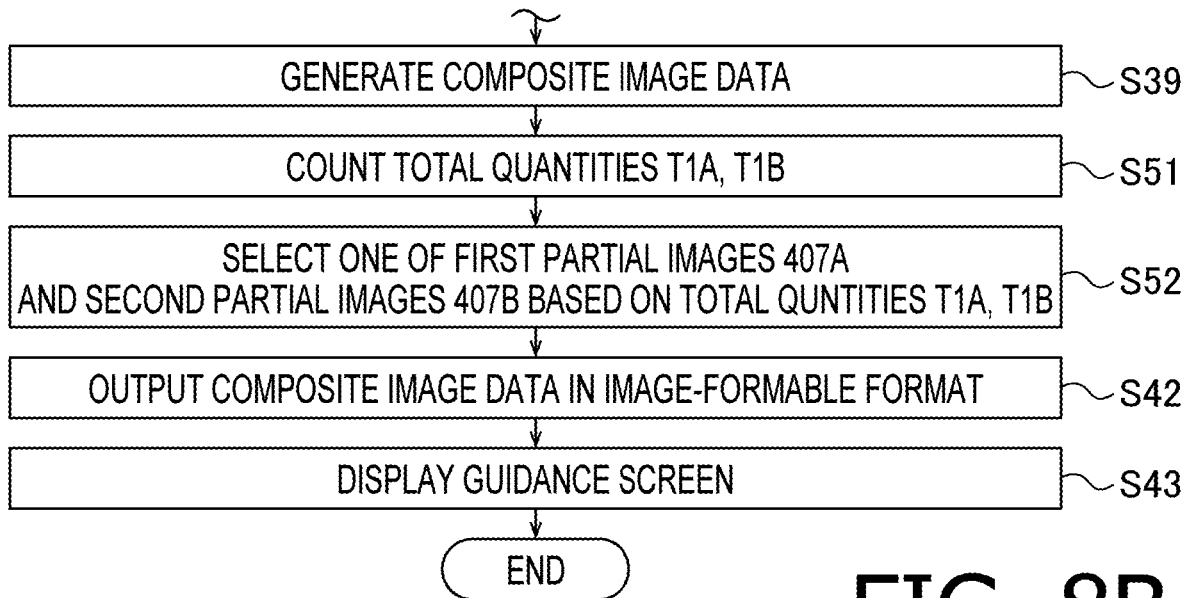
Figure 8C:
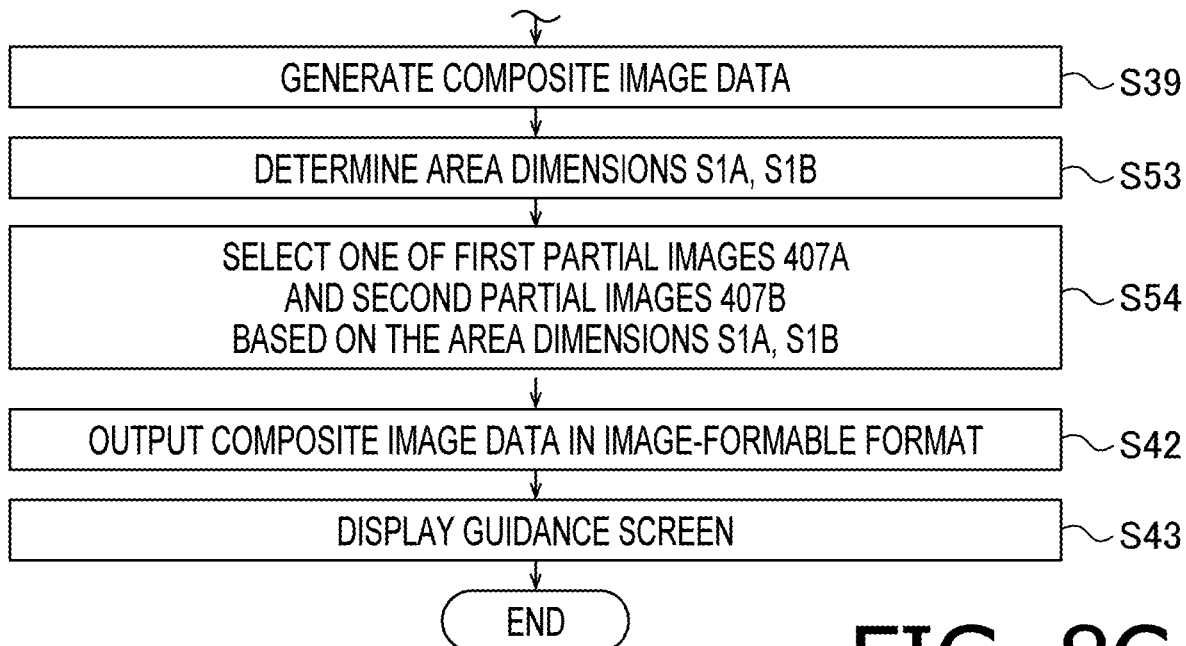

FIG. 8A is a flowchart to illustrate flows of steps to be executed by the editor program 29 in the information processing apparatus 100 according to a second embodiment of the present disclosure. FIGS. 8B-8C are first and second modified examples of the flows of the steps to be executed by the editor program 29 in the information processing apparatus 100 according to the second embodiment of the present disclosure.

Figure 9A:
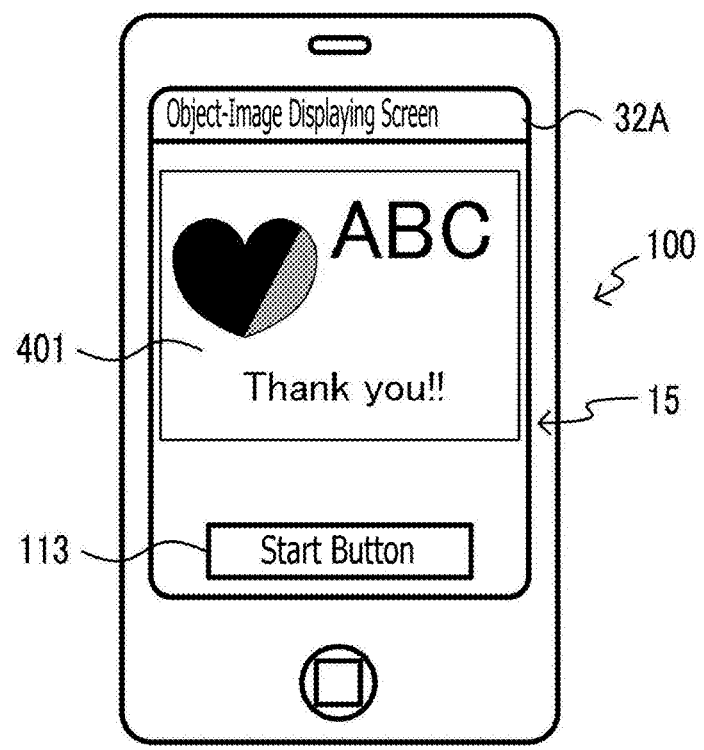
Figure 9B:
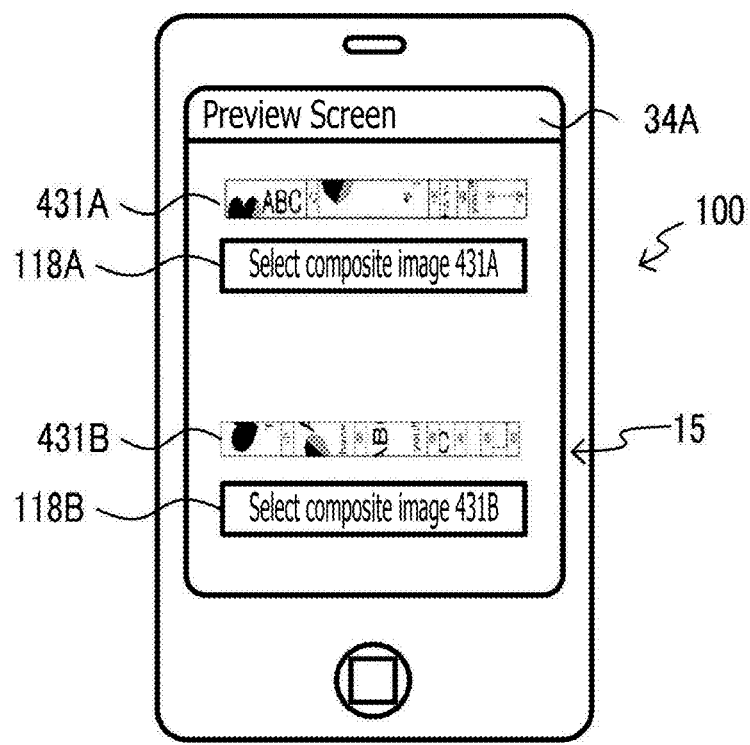
Figure 9C:
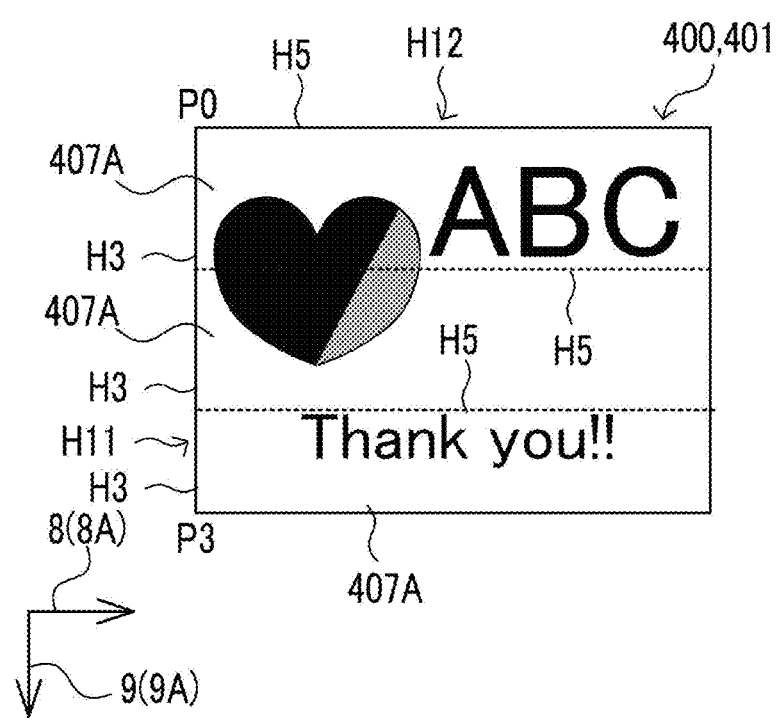
Figure 9D:
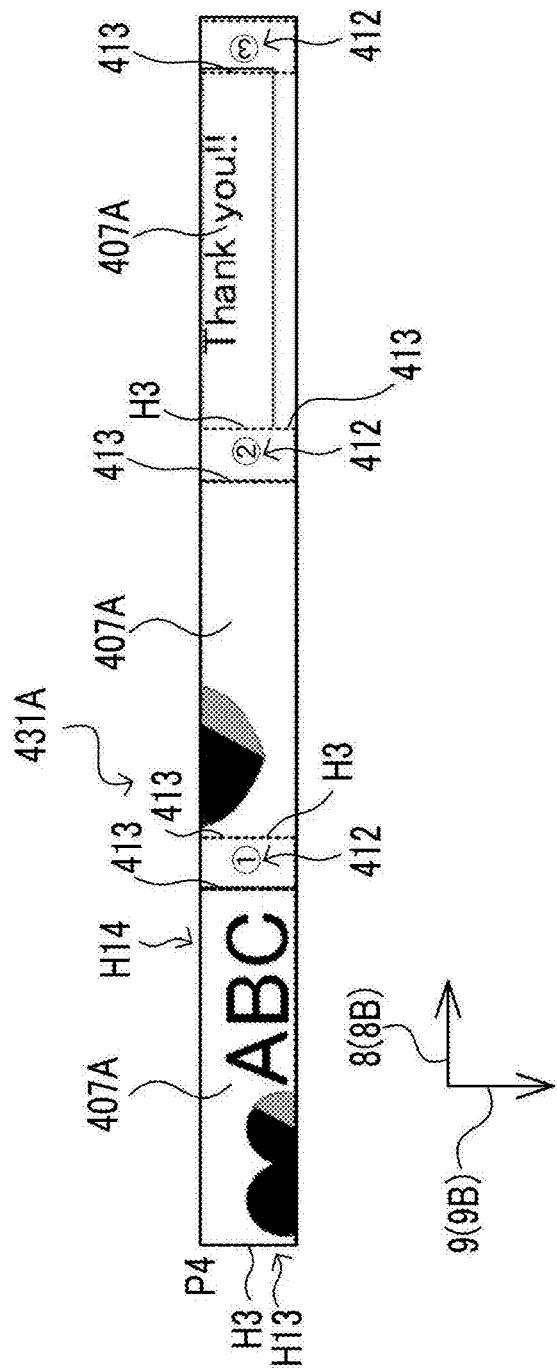

FIGS. 9A-9B are illustrative views of an object-image displaying screen 32A and a preview screen 34A to be displayed in the display 15, respectively, in the information processing apparatus 100 according to the second embodiment of the present disclosure. FIG. 9C is an illustrative view of arrangement of first partial images 407A composed of the unit of object image data 401 to be arranged by the editor program according to the second embodiment of the present disclosure. FIG. 9D is an illustrative view of a composite image 431A to be generated by the editor program 29 according to the second embodiment of the present disclosure.

Figure 10A:
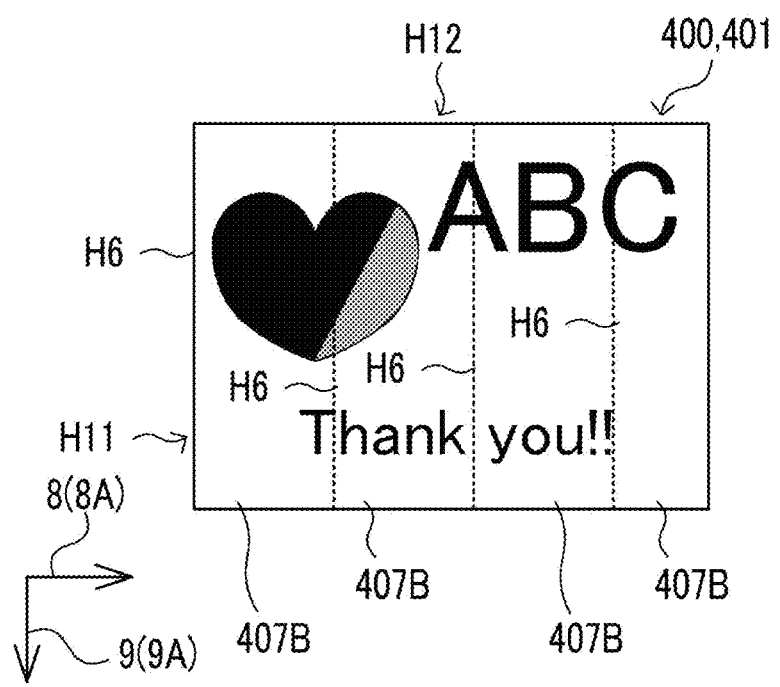
Figure 10C:
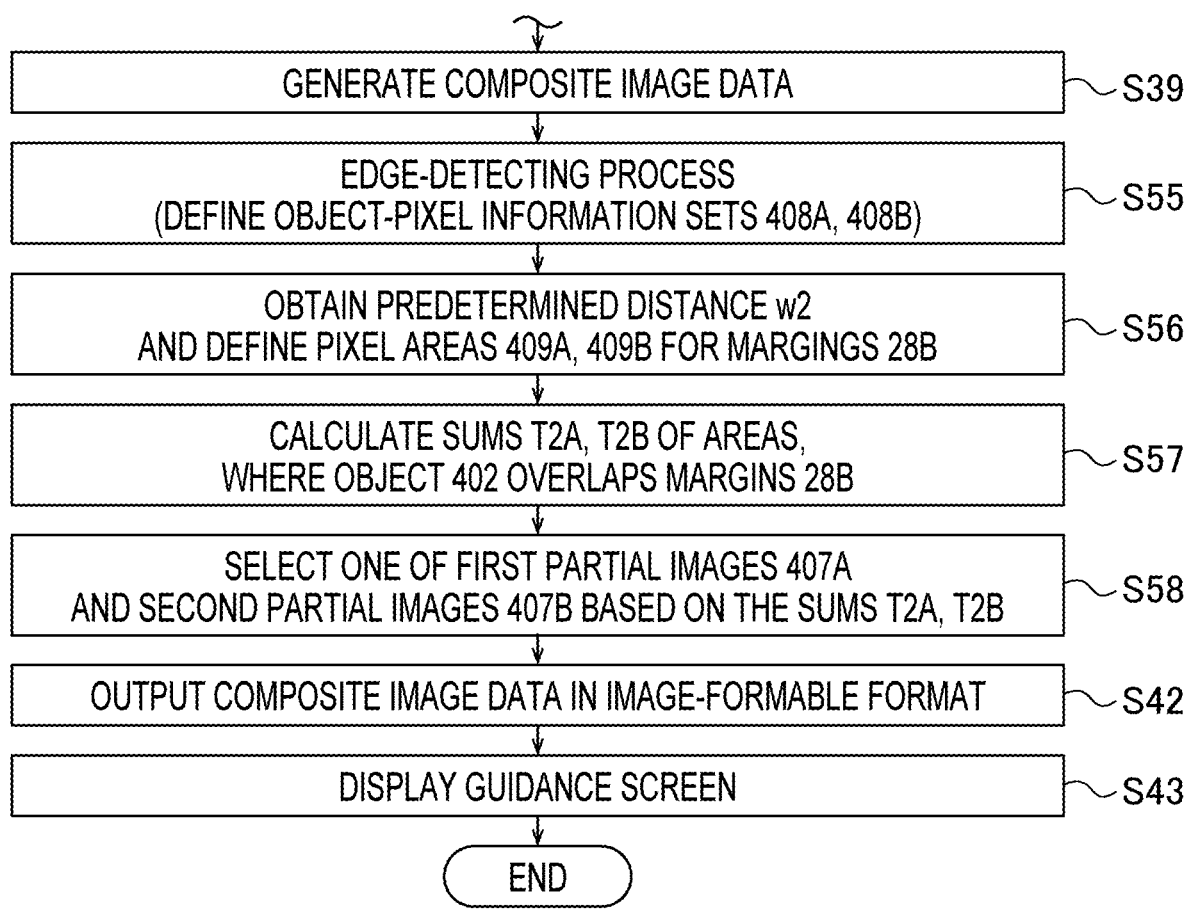

FIG. 10A is an illustrative view of arrangement of second partial images 407B composed of the unit of object image data 401 to be arranged by the editor program according to the second embodiment of the present disclosure. FIG. 10B is an illustrative view of a composite image 431B to be generated by the editor program 29 according to the second embodiment of the present disclosure. FIG. 10C is a third modified example of the flows of the steps to be executed by the editor program 29 in the information processing apparatus 100 according to the second embodiment of the present disclosure.

Figure 11A:
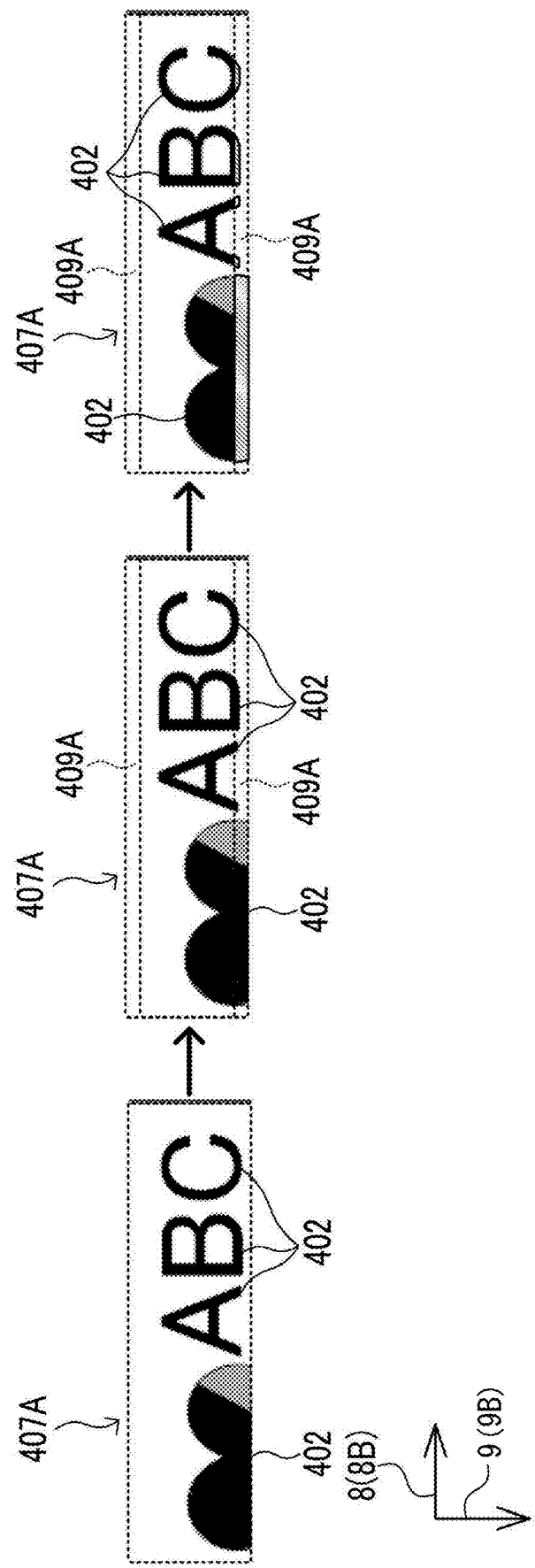
Figure 11B:
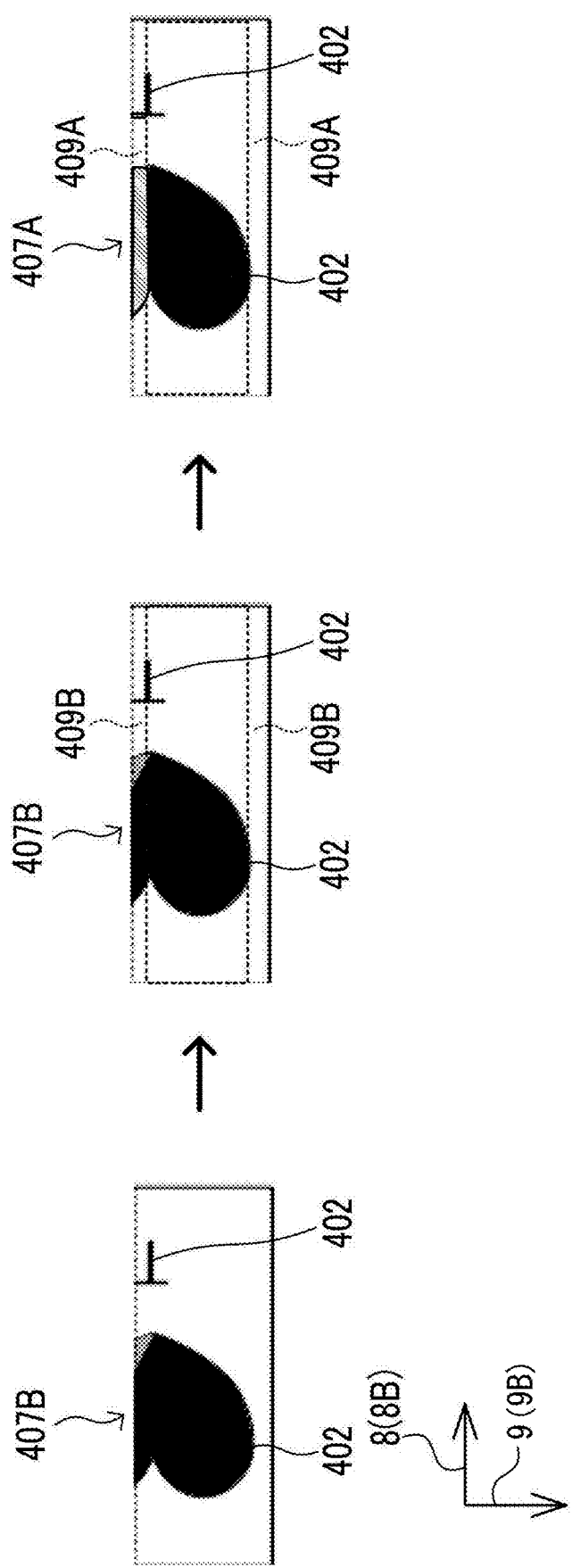

FIG. 11A-11B are illustrative views of processes to the first partial images 407A and the second partial images 407B to be executed by the editor program 29 in the information processing apparatus 100 in the third modified example of the second embodiment of the present disclosure.

DETAILED DESCRIPTION

In the following paragraphs, with reference to the accompanying drawings, described will be embodiments of the present disclosure. It is noted that various connections may be set forth between elements in the following description. These connections in general and, unless specified otherwise, may be direct or indirect and that this specification is not intended to be limiting in this respect. It will be understood that those skilled in the art will appreciate that there are numerous variations and permutations of an information processing apparatus and a computer-readable storage medium that fall within the spirit and scope of the invention.

As shown in FIG. 1, an information processing apparatus 100 and an image forming apparatus 200 may communicate with each other through a communication network 300. The information processing apparatus 100 includes, for example, a smartphone, a tablet terminal, and a personal computer. The information processing apparatus 100 may generate imaging data, which composes an image to be formed on a sheet in the image forming apparatus 200.

The imaging data may be transmitted from the information processing apparatus 100 to the image forming apparatus 200 through the communication network 300. The communication network 300 may be, for example, wired LAN, wireless LAN, and a combination of the wired and wireless LANs. However, the information processing apparatus 100 and the image forming apparatus 200 may not necessarily communicate through LAN(s), but the information processing apparatus 100 and the image forming apparatus 200 may be connected to communicate with each other through, for example, a USB cable.

The image forming apparatus 200 may include, for example, a label printer capable of forming an image on a sheet 28 based on the imaging data received through, for example, the communication network 300, and discharge the sheet 28 with the image formed thereon outside.

The information processing apparatus 100 includes, but not limited to, a CPU 11, a memory 12, a communication interface (I/F) 13, a user interface (I/F) 14, a display 15, and a communication bus 16. The components in the information processing apparatus 100 are connected to communicate with one another through the communication bus 16.

The CPU 11 may control overall actions and processes in the image forming apparatus 100. The CPU 11 may, in response to operations input by a user through the user I/F 14, read and run programs stored in the memory 12.

The memory 12 includes memory media such as ROM, RAM, and EEPROM, and a buffer in the CPU 11. The memory 12 may include any computer-readable storage medium, which is a non-transitory medium. The non-transitory medium may include a tangible medium. Meanwhile, electrical signals conveying a program that is downloadable through the Internet from, for example, a server (not shown), may form a computer-readable signal medium but may not form a non-transitory computer-readable storage medium.

The memory 12 has a program storage area 12A and a data storage area 12B. The program storage area 12A may store programs, including an OS 28 and an editor program 29. The OS 28 is a basic program in the information processing apparatus 100. The program storage area 12A may further store a driver 210.

The editor program 29 may, in response to operations by a user input through the user I/F 14, generate imaging data. In order to generate the imaging data, the editor program 29 may input and output various kinds of information and data in and from the OS 28. The editor program 29 may include a single program and a collection of program modules. The editor program 29 will be described further below.

The data storage area 12B may store various kinds of information and data to be used and processed by the editor program 29 and the OS 28.

The communication I/F 13 may include, for example, a communication interface for Wi-Fi (registered trademark). When the information processing apparatus 100 is connected with the image forming apparatus 200 through a USB cable, the communication I/F 13 is in compliance with the USB standard. The communication I/F 13 may transmit the information and the data output from the OS 28 to the image forming apparatus 200 through the communication network 300. Moreover, the communication I/F 13 may output the information and the data received from the image forming apparatus 200 to the OS 28.

The user I/F 14 is an interface, through which the operations by the user may be input. In particular, the user I/F 14 may include a touch sensor and hardware buttons (not shown).

The display 15 includes, for example, a liquid crystal display and an organic EL display, and has a displaying surface, on which screens for the ongoing operations may be displayed. The screens may contain objects including, for example, text, image, icon, and text box. The user's operations may include operations to designate the object(s) by use of an input device or a pointer including the user's finger, a stylus, and a pen, and operations to input text and/or numerical figures in the object(s).

The image forming apparatus 200 includes, but not limited to, a CPU 21, a memory 22, a communication I/F 23, a cartridge 27, a conveyer 24, and a recording head 25, which are connected with one another through a communication bus 26. The CPU 21, the memory 22, and the communication I/F 23 in the image forming apparatus 200 may be in equivalent or similar structures to the CPU 11, the memory 12, and the communication I/F 13, respectively, in the information processing apparatus 100; therefore, detailed description of those is herein omitted.

The memory 22 has a program storage area 22A and a data storage area 22B. The program storage area 22A may store programs, including an OS 221 and a controlling program 222. The OS 221 is a basic program in the image forming apparatus 200. In order to control image-forming in the image forming apparatus 200, the controlling program 222 may execute various kinds of processes and input and output various kinds of information and data in and from the OS 221. The data storage area 12B may store information and data to be used by the controlling program 222 and the OS 221.

As shown in FIG. 2A, the cartridge 27 is attachable to the image forming apparatus 200. The cartridge 27 may include a reeled sheet 28. The sheet 28 may be, for example, an elongated strip of adhesive label. The sheet 28 may be unreeled and conveyed outside the cartridge 27 by the conveyer 24 along a lengthwise direction 5. The lengthwise direction 5 is an elongated or extending direction of the sheet 28 and coincides with a conveying direction for the sheet 28 and with a second direction. The cartridge 27 includes a memory 27A (see FIG. 1). The memory 27A stores sheet information, which at least includes information concerning a sheet width w1. The sheet width w1 is a dimension of the sheet 28 in a widthwise direction 6 and is fixed. The widthwise direction 6 may intersect orthogonally with the lengthwise direction 5 and coincides with a first direction. When the sheet 28 is a strip of label, of which length is unfixed, the sheet information may not include information concerning a sheet length.

The conveyer 24 may convey the sheet 28 unreeled from the cartridge 27 to the recording head 25. The recording head 25 may form an image composed of the imaging data on the sheet 28 under the control of the controlling program 222 in one of known printing technics including, for example, inkjet-printing, electro-photographic printing, and thermaltransfer printing. The conveyer 24 may eject the sheet 28 with the image formed thereon outside the image forming apparatus 200.

The sheet 28 includes, as shown in FIG. 2A, an image-formable area 28A. The image-formable area 28A may be, for example, an entire range on an image-formable surface of the sheet 28. The image-formable area 28A is rectangular and has a first side H1, which extends along the widthwise direction 6, and a second side H2, which extends along the lengthwise direction 5. A dimension of the first side H1 is equal to the sheet width w1. Meanwhile, depending on the configuration and/or user's preference in the recording head 25, the recording sheet 25 may not be adapted to form an image in the entire range of the image-formable area 28A. In such a case, as shown in FIG. 2A, the image-formable area 28A may include margins 28B. The margin 28 is an area, in which an image may not be formed, within the image-formable area 28A. The margins 28 may be located on ends of the image-formable area 28A in the widthwise direction 6.

In the following paragraphs, processes to be conducted by the CPU 11 of the information processing apparatus 100 in compliance with instructions described in the programs stored in the memory 12 will be explained. In this regard, terms to express the actions in the information processing apparatus 100 such as judging, extracting, selecting, calculating, determining, specifying, obtaining, accepting, controlling, and setting may represent processes conducted by the CPU 11. The processes to be conducted by the CPU 11 may include control over hardware devices by a controller, including the OS 28, in the information processing apparatus 100. Meanwhile, an act of obtaining may not necessarily be limited to a result of requesting. In other words, the CPU 11 may receive data without requesting the data, and the act of receiving may still be expressed as "the CPU 11 obtains the data." Moreover, a term "data" in the present disclosure may mean a bit string readable by a computer. Data units containing substantially the same contents but in different formats may be regarded as a same data unit, and a term "information" may be regarded similarly. Terms for actions of "requesting," "instructing," and "commanding" may represent outputting information that composes the request, the instruction, and the command, respectively, to another party. Meanwhile, the information that composes the request, the instruction, and the command may be expressed by terms "request," "instruction," and "command," respectively. Meanwhile, an action by the CPU 11 to store information or data in the data storage area 12B may be expressed by the term "obtain."

Moreover, processes to be conducted by the CPU 11 in compliance with the commands contained in the programs may be described in simplified or anthropomorphic expressions such as "the CPU 11 conducts the process," "the editor program 29 conducts the process," or "the information processing apparatus 100 conducts the process." Further, input or output of information conducted by the programs through the communication I/F 13 or the user I/F 14 may be described also in simplified or anthropomorphic expressions such "the CPU 11 receives the information," "the editor program 29," or "the information processing apparatus 100 obtains the information."

Moreover, a process conducted by the CPU 11 to determine, for example, whether information "A" indicates occurrence of an event "B" may be described in an expression such as "the CPU 11 determines occurrence of an event "B" based on information "A." Further, a process conducted by the CPU 11 to determine, for example, whether information "A" indicates occurrence of an event "B" or "C" may be described in an expression such as "the CPU 11 determines whether an event "B" or "C" occurs.

In the present disclosure, the terms "data" and "information" may be considered to have common meanings in a sense that they both may denote a bit or a string of bits that may be processed by a computer. However, data and information may be distinguished from each other by meaning(s) of content in the bit or the bit string. That is, while the bit or the bit string in the data may be processed by the computer without considering the meaning of the content thereof, actions of the computer may vary depending on the content of the bit or the bit string in the information. Information may be contained in a command, which may be a controlling signal transmitted from the computer to a receiver device to cause the receiver device to act responsively to the information, or the command itself may have the characteristics of information.

While formats of data and information (e.g., text format, binary format, and flag format) may be converted among a plurality of computers, the data and the information may be regarded as identical data and information as long as the contents of the data and the information before and after the conversion are maintained unchanged. For example, information indicating a quantity "2" may be described as "0x32" in ASCII code in the text format to be stored in one computer and as "10" in the binary format to be stored in another computer.

Meanwhile, data and information may not necessarily be distinctively exclusive to each other but may be occasionally equated with each other. For example, data may be temporarily regarded as information, and vice versa. For another example, data handled in one device may be handled as information in another device, and vice versa. For another example, information may be extracted from data, and vice versa.

Moreover, in the present disclosure, a phrase "in response to" may mean that once a condition described in a preceding clause including the phrase is met, an action described in a subsequent clause may be performed. In this regard, the action described in the subsequent clause may not necessarily be performed immediately after the condition in the preceding clause is met as long as the action is performed later than the condition being met.

In the following paragraphs, described with reference to FIGS. 1 through 7A-7B will be a process to be conducted by the editor program 29 according to a first embodiment of the present disclosure.

As shown in FIG. 3A, as the editor program 29 starts, in S1, the editor program 29 obtains a width of the image-formable area 28A, i.e., the sheet width w1. In particular, the editor program 29 obtains the sheet width w1 being the sheet information through the communication with the image forming apparatus 200.

Optionally, the editor program 29 may not necessarily obtain the sheet information through the communication with the image forming apparatus 200. For example, while the sheet information may be stored in the data storage area 12B in the information processing apparatus 100 or a server (not shown) connected to the Internet (not shown), the editor program 29 may obtain the sheet information from the data storage area 12B or the server. Optionally, further, the sheet information may be stored in the editor program 29, and the editor program 29 may store the sheet information from the storage thereof.

In S2, the editor program 29 displays an image-selectable screen, which includes a plurality of image icons. Each image icon displayed in the image-selectable screen is associated with a unit of object image data 400 (see FIG. 2C) correspondingly. The editor program 29 may generate or obtain displayable data composing a screen and input the generated or obtained displayable data in the OS 28 to cause the screen to be displayed in the display 15 through the OS 28.

A unit of object image data 400 composes an object image 401, for example, as shown in FIG. 2B. The object image 401 is a rectangular image having sides H11, H12, which extend from an origin point P0. The sides H11, H12 extend along the first direction 9 and the second direction 8, respectively. The first direction 9 and the second direction 8 coincide with a widthwise direction 9A and a lengthwise direction 8A of the object image 401, respectively. In the present embodiment, the widthwise direction 9A and the lengthwise direction 8A coincide with the directions, in which the sides H11, H12 extend from the origin point P0, respectively. Lengths of the sides H11, H12 are greater than the sheet width w1 (see FIG. 2A).

The object image 401 includes at least one (1) object 402. The object 402 may represent, for example, a figure or a character string to be arranged over a background 403 and may include, for example, objects 402A-402C. The object 402A may represent a heart, the object 402B may represent characters included in a character string "ABD," and the object 402C may represent characters and signs included in a character string "Thank you!!". The object image 401 may include, for another example, a picture including a background and a photographed figure.

As shown in FIG. 2C, a unit of object image data 400 includes size information 404 and a plurality of units of pixel information 405 to compose the object image 401. The size information 404 indicates a size of the object image 401 in the lengthwise direction 8A. Each unit of pixel information 405 includes values for red (R), green (G), blue (B), and brightness in a pixel that constitutes the object image 401. The units of pixel information 405 are arranged in one-dimensional array coinciding with the second direction 8, or the lengthwise direction 8A. In particular, a unit of pixel information 405 for a pixel located at the origin point P0 is arrayed next to the size information 404, and units of pixel information 405 for pixels located subsequently in the object image 401 along the second direction 8 or the lengthwise direction 8A are arrayed in the order of the arrangement in the object image 401.

In S2 (see FIG. 3A), further, the editor program 29 may receive a user's operation to designate one of the image icons displayed in the display 15 through the user I/F 14 and read the object image data 400 corresponding to the designated one of the image icons from the data storage area 12B. The editor program 29 may generate displayable data, which composes an object-image displaying screen 32 (see FIG. 4A), based on the object image data 400 having been read. The object image data 400 being currently read to be processed may be called as focused image data 400. In S3, the editor program 29 controls the display 15 to display the object-image displaying screen 32 based on the generated displayable data.

Optionally, the editor program 29 may not necessarily obtain the object image data 400 from the data storage area 12B. For example, while the OS 28 may share data stored in the memory 12 with other programs stored in the program storage area 12A, the editor program 29 may obtain the object image data 400 designated by another one of the programs through the OS 28. For another example, while the editor program 29 may create object image data 400 within the data storage area 12B in response to the user's operations, the editor program 29 may obtain the created object image data 400 within the data storage area 12B.

As shown in FIG. 4A, the object-image displaying screen 32 includes an image resized from the object image 401 composed of the focused image data 400, a start button 113, and a setting button 114. In the present embodiment, the object image 401 composed of the focused image data 400 may be called as a focused object image 401. The start button 113 and the setting button 114 are designative objects that may be designated by the user through the user I/F 14. The start button 113 may be designated by the user's operation to start image forming, the setting button 117 may be designated by the user's operation to setup the image forming.

In S3 (see FIG. 3A), the editor program 29 may further receive the user's operation designating either the start button 113 or the setting button 114. In S4, the editor program 29 determines whether the object designated by the user's operation in S3 was the start button 113 or the setting button 114. If the start button 113 was designated, the editor program 29 proceeds to S7. If the setting button 114 was designated, the editor program 29 proceeds to S5 and controls the display 15 to display a setting screen 33 (see FIG. 4B).

The setting screen 33 includes a reference-designative checkbox 115 and a return button 116. The reference-designative checkbox 115 is a designative object that may be designated by the user to designate the origin point P0 (see FIG. 2B) as a reference point for a defining process, which is performed in one of the steps from S8 through S15 and from S16 through S23 in FIG. 3C. When the origin point P0 is not designated as the reference point for the defining process, a vertex P3 (see FIG. 2B) of the focused object image 401 may be designated as the reference point. In other words, the reference point for the defining process is either one end or the other end of the side H11 in the widthwise direction 9A in the focused object image 401 (see FIG. 2B). The defining process will be described with reference to FIGS. 5A-5D in the following paragraphs.

For image forming in the present embodiment, the information processing apparatus 100 defines a plurality of partial images 406 (see FIGS. 5A and 5C) in the focused object image 401. The focused object image 401 has four (4) sides, of which lengths are each greater than the sheet width w1. Each of the plurality of partial images 406 has a side having a predetermined length, which is in a fixed value equal to the sheet width w1. However, optionally, the predetermined length may be smaller than the sheet width w1. The information processing apparatus 100 identifies a plurality of units of pixel information 405 (see FIG. 2C) corresponding to each of the partial images 406. The partial images 406 include a first partial image 406A and a second partial image 406B, as shown in FIGS. 5A and 5C, and may further include a third partial image 406C. Each of the first, second, and third partial images 406A, 406B, 406C is one of the partial images 406, into which the object image 401 is divided by broken lines shown in FIGS. 5A and 5C. As shown in FIGS. 5A and 5C, for example, the partial images 406 may include two (2) first partial images 406A, three (3) second partial images 406B, and one (1) third partial image 406C.

Each first partial image 406A has a side H3 extending along the widthwise direction 9A. A length of the side H3 is equal to the predetermined length. The first partial image 406A has the same size in the lengthwise direction 8A as the object image 401.

Each second partial image 406B has a side H4 extending along the lengthwise direction 8A. A length of the side H4 is equal to the predetermined length. The second partial image 406B has a size smaller in the widthwise direction 9A than the predetermined length.

In the case where the origin point P0 is designated as the reference point, one of the first partial images 406A includes the origin point P0, and one of the second partial images 406B includes the vertex P3 (see FIG. 5A).

The third partial image 406C is a remainder of the object image 401 after the first partial images 406A and the second partial images 406B are defined and subtracted from the object image 401.

In the case where the vertex P3 is designated as the reference point, as shown in FIG. 5C, this latter case, in which the vertex P3 is designated as the reference point, and the former case, in which the origin point P0 is designated as the reference point, are similar to each other in an aspect that the editor program 29 identifies the units of pixel information 405 corresponding to the first through third partial images 406A-406C. On the other hand, the latter case, in which the vertex P3 is designated as the reference point, is different from the former case, in which the origin point P0 is designated as the reference point (see FIG. 5A), in that one of the first partial images 406 includes the vertex P3 and one of the second partial images 406B includes the origin point P0.

The return button 116 is an object to be designated by the user through the user I/F 14 when the user desires to cause the screen of the display 15 to return from the setting screen 33 to the object-image displaying screen 32.

The user may, after operating the reference-designative checkbox 115 through the user I/F 14, operate the return button 116. In other words, in S5 (see FIG. 3A), the editor program 29 may receive the user's operation to the reference-designative checkbox 115 and the return button 116. In S6, the editor program 29 obtains reference information, which indicates the reference point for the defining process corresponding to the user's operation to the reference-designative checkbox 115, and stores the obtained reference information in the data storage area 12B. The reference information includes one of a first status value and a second status value. The first status value indicates that the reference point is at the origin point P0, and the second status value indicates that the reference point is not at the origin point P0. The editor program 29 returns to S3 in response to the user's operation to the return button 116 in S5 and controls the display 15 to once again display the object-image displaying screen 32.

In S7, the editor program 29 determines whether the reference information indicates the first status value. If the reference information does not indicate the first status value (S7: NO), the editor program 29 proceeds to S16 (see FIG. 3C). If the reference information indicates the first status value (S7: YES), in S8, the editor program 29 sets a counter (not shown) at 1 being an initial value. The counter may count consecutive numbers, and a value in the counter, which will hereinafter be called as counter value, indicates an ordinal number, by which the units of pixel information 405 corresponding to one of the first partial images 406A through the third partial image 406C are identified in S8-S15. In other words, the units of pixel information 405 corresponding to each of the partial images 406 are collectively given a counter value indicating an ordinal number.

In S9, the editor program 29 identifies the units of pixel information 405 corresponding to one of the first partial images 406A that includes the origin point P0 (see FIG. 5A) among the entire units of pixel information 405 contained in the focused image data 400 based on the size information 404 and the predetermined length. Further, in S9, the editor program 29 stores the identified units of pixel information 405 in the storage area 15B. The identified units of pixel information 405 corresponding to one of the partial images 406 are defined as a set of pixel information 405. In the following description, the identified units of pixel information 405 corresponding to one of the partial images 406 may be called as a pixel information set 405. Meanwhile, the acts by the editor program 29 of defining the pixel information set 405 corresponding to one of the partial images 406 and storing the defined pixel information set 405 in the data storage area 12B may be described in a more simplified expression such as "the editor program 29 defines a partial image 406." In S9, the editor program 29 assigns a latest counter value to a defined pixel information set 405A and increments the count value by 1. In the following paragraphs, the acts by the editor program 29 of assigning a latest current value to the defined pixel information set 405 and incrementing the count value by 1 may be called as an assigning process.

In S10, the editor program 29 determines whether a size of a first differential image in the widthwise direction 9A is greater than or equal to the predetermined length preset in the editor program 29. The first differential image is a remainder image in the focused object image 401 after the defined first partial image(s) 406A is/are subtracted.

If the size of the first differential image in the widthwise direction 9A is greater than or equal to the predetermined length (S10: YES), in S11, the editor program 29 defines another pixel information set 405A corresponding to another one of the first partial images 406A (see FIG. 5A) among the pixel information units 405 corresponding to the first differential image, in the same manner as S9. The another one of the first partial images 406A shares one of the sides extending along the lengthwise direction 8A with the one of the first partial image 406A, of which pixel information set 405 was defined in the immediate past. In S11, further, the editor program 29 conducts the assigning process and returns to S10.

In S10, on the other hand, if the size of the first differential image in the widthwise direction 9A is smaller the predetermined length (S10: NO), in S12 (see FIG. 3B), the editor program 29 defines the units of pixel information 405 corresponding to one of the second partial images 406B that includes the vertex P3 (see FIG. 5A) among the units of pixel information 405 contained in the first differential image as a pixel information set 405B. In S12, further, the editor program 29 conducts the assigning process.

In S13, the editor program 29 determines whether a size of a second differential image in the lengthwise direction 8A is greater than or equal to the predetermined length. The second differential image is a remainder image in the focused object image 401 after the defined first partial image(s) 406A and the defined second partial image(s) 406B are subtracted.

If the size of the second differential image in the lengthwise direction 8A is greater than or equal to the predetermined length (S13: YES), in S14, the editor program 29 defines the units of pixel information 405 corresponding to another one of the second partial images 406A (see FIG. 5A) among the units of pixel information 405 corresponding to the second differential image, as a pixel information set 405B in the same manner as S12. The another one of the second partial images 406B shares one of the sides extending along the widthwise direction 9A with the one of the second partial image(s) 406B, of which pixel information set 405 was defined in the immediate past. The editor program 29 returns to S13.

In S13, on the other hand, if the size of the second differential image in the lengthwise direction 8A is smaller the predetermined length (S13: NO), and if any pixel information 405 corresponding to another second differential image still remains, in S15, the editor program 29 defines the remaining units of pixel information 405 corresponding to the second differential image as a pixel information set 405C corresponding to the third partial image 406C (see FIG. 5A).

In the following paragraphs, a process in S16 through S23, as shown in FIG. 3C, in other words, the defining process when the reference point is designated at the vertex P3, will be described. Meanwhile, steps in S16-S23 may be similar to S8-S15; therefore, description for S16-S23 may be simplified.

In S16, the editor program sets the counter value at 1 being the initial value.

In S17, the editor program defines a pixel information set 405A corresponding to one of the first partial images 406A containing the vertex P3 (see FIG. 5A). In S17, further, the editor program 29 conducts the assigning process.

In S18, the editor program 29 determines whether a size of the first differential image in the widthwise direction 9A is greater than or equal to the predetermined length. If the size of the first differential image is greater than or equal to the predetermined length (S18: YES), in S19, the editor program 29 defines another pixel information set 406A corresponding to another one of the first partial images 406A (see FIG. 5C) among the units of pixel information 405 corresponding to the first differential image. In S19, further, the editor program 29 conducts the assigning process and returns to S18.

In S18, on the other hand, if the size of the first differential image in the widthwise direction 9A is smaller the predetermined length (S18: NO), in S20, the editor program 29 defines a pixel information set 405B corresponding to one of the second partial images 406B that includes the origin point P0 (see FIG. 5C) among the units of pixel information 405 contained in the first differential image. In S20, further, the editor program 29 conducts the assigning process. In S21, the editor program 29 determines whether the a of the second differential image in the lengthwise direction 8A is greater than or equal to the predetermined length.

In S21, if the size of the second differential image is greater than or equal to the predetermined length (S21: YES), in S22, the editor program 29 defines another pixel information set 405B corresponding to another one of the second partial images 406B (see FIG. 5C) among the units of pixel information 405 corresponding to the second differential image. The editor program 29 returns to S21.

In S21, on the other hand, if the size of the second differential image is smaller the predetermined length (S21: NO), and if any pixel information 405 corresponding to another second differential image still remains in the focused image data 400, in S23, the editor program 29 defines the remaining pixel information 405 corresponding to the second differential image as a pixel information set 405C corresponding to the third partial image 406C (see FIG. 5C).

Following S15 or S23, in S24, the editor program 29 generates a unit of composite image data 410, which composes a composite image 411 as shown in FIGS. 5B and 5D. The composite image 411 has a rectangular shape having sides H13, H14 extending from an origin point P4. The sides H13, H14 extend along the first direction 9 and the second direction 8, respectively. The first direction 9 and the second direction 8 correspond to a widthwise direction 9B and a lengthwise direction 8B of the composite image 411, respectively. In the present embodiment, the widthwise direction 9B is a single direction, in which the side H13 extends from the origin point P4; and the lengthwise direction 8B is a single direction, in which the side H14 extends from the origin point P4. A length of the side H13 is equal to the predetermined length.

As shown in FIGS. 5B and 5D, the composite image 411 includes the first partial images 406A, the second partial images 460B, the third partial image 406C, and a plurality of ordinal objects 412. The editor program 29 arrays the first partial images 406A through the third partial image 406C, in an arrangement such that the sides H3 of the first partial images 406A and the sides H4 of the second partial images 406B align along the first direction 9, or the widthwise direction 9B, in the composite image 411. In other words, the editor program 29 arranges the second partial images 406B, in an orientation rotated for 90 degrees with respect to the focused object image 401, in the composite image 411. Meanwhile, between the two (2) sides of each second partial image 406B extending along the first direction 9, the side H4 is located closer to the origin point P4. Moreover, the third partial image 406C may be arranged in the orientation rotated for 90 degrees with respect to the focused object image 401, similarly to the second partial images 406B.

In the composite image 411, the first through third partial images 406A-406C are arrayed along the second direction 8 in the defined order with reference to the origin point P4. Moreover, two (2) partial images 406 that are next to each other are arranged to be spaced apart in the composite image 411.

In the composite image 411, moreover, on an edge of each of the first through third partial images 406A-406C at an end along the second direction 8, i.e., on one side of each of the first through third partial images 406A-406C extending along first direction 9, arranged is a linear object 413, which may be used by the user when the user cuts the first through third partial images 406A-406C off from the sheet 28. Optionally, a linear object may be additionally arranged on one of the sides of the third partial image 406C extending along the second direction 8.

The ordinal objects 412 are each arranged in a gap adjacent to a corresponding one of the first through third partial images 406A-406C in the composite image 411.

The ordinal object is an image object indicating the counter value assigned to each of the first through third partial images 406A-406C. An orientation of each ordinal object 412 in the composite image 41 indicates an original orientation of the corresponding one of the first through third partial images 406A-406C in the object image 401. In other words, the ordinal objects 412 indicate correspondence between the orientation of the focused object image 401 and the orientations of the first through third partial images 406A-406C in the composite image 411. For example, when the counter value is in an upright orientation, the first partial image 406A, the second partial image 406B, or the third partial image 406C corresponding to the counter value may be arranged in the composite image 411 without being rotated for 90 degrees with respect to the focused object image 401. On the other hand, when the counter value is in a lying orientation, the first partial image 406A, the second partial image 406B, or the third partial image 406C corresponding to the counter value may be rotated for 90 degrees with respect to the focused object image 401 in the composite image 411.

The unit of composite image data 410 to compose the composite image 411 has a data structure similar to the data structure of the unit of object image data 400 as shown in FIG. 2C. In the composite image data 410, however, unlike the object image data 400, the size information 404 indicates a size of the composite image 411 in the lengthwise direction 8B. Moreover, the units of pixel information 405 are arranged in one-dimensional array coinciding with the second direction 8, or the lengthwise direction 8B.

Following S24 (see FIG. 3B), in S25, the editor program 29 generates displayable data composing a preview screen 34 (see FIG. 4C) based on the unit of composite image data 410 generated in S24. Further, the editor program 29 controls the display 15 to display the preview screen 34 based on the generated displayable data.

As shown in FIG. 4C, the preview screen 34 includes the composite image 411 composed of the unit of composite image data 410, a first button 117A, and a second button 117B. The first button 117A and the second button 117B are designative object that may be designated by the user's operation. The first button 117A may be designated by an operation by the user who views the composite image 411 in the preview screen 34 and confirms that image-forming for the composite image 411 may be started. The second button 117B may be, on the other hand, designated by the user to cancel the image-forming.

In S25 (see FIG. 3B), the editor program 29 may further receive the user's operation, which is the operation to the first button 117A or the second button 117B. In S26, the editor program 29 determines whether object designated by the user's operation in S25 was the first button 117A or the second button 117B. If the second button 117B was designated, the editor program 29 ends the process shown in FIGS. 3A-3C. If the first button 117A was designated, in S27, the editor program 29 converts the unit of composite image data 410 into a unit of composite image data in an image-formable format and outputs the converted unit of composite image data to the OS 28. The OS 28 may output the composite image data in the image-formable format to the communication network 300 through the communication I/F 13.

Optionally, the editor program 29 may not necessarily output the composite image data in the image-formable format to the communication network 300 through the OS 28, but the composite image data in the image-formable format may be transmitted from the information processing apparatus 100 to the image forming apparatus 200 in a manner described below. This option may be similarly applied to a second embodiment of the present disclosure, which will be described later.

It may be noted that there may be a case that the program storage area 12A (see FIG. 1) stores the driver 210 to drive the image forming apparatus 200. In such a case, the driver 210 may obtain the composite image data 410 generated by the editor program 29 through the OS 28. The driver 210 may convert the obtained composite image data 410 into composite image data in an image-formable format and output the converted composite image data to the communication network 300.

Alternatively, for another example, the editor program 29 may provide the composite image data directly in the image-formable format to the communication I/F 13, and the communication I/F 13 may output the received composite image data in the image-formable format to the communication network 300.

Alternatively, for another example, the information processing apparatus 100 may transmit the composite image data to a server connected to the Internet. The server may convert the received composite image data into the image-formable format and transmit the converted composite image data to the image forming apparatus 200.

Following S27 (see FIG. 3B), in S28, the editor program 29 controls the display 15 to display a guidance image 420 (see FIG. 6). The guidance image 420 may show a procedure to reproduce the object image 401 from the first partial images 406A, the second partial images 406B, and the third partial image 406C. In particular, the editor program 29 stores the pixel information sets 405A-405C and the defined order assigned to the pixel information sets 405A-406C in the data storage area 12B. Based on the defined order, the editor program 29 controls the display 15 to display the first through third partial images 406A-406C corresponding to the pixel information sets 405A-405C according to the defined order. Thus, the guidance image 420 may be displayed in the display 15 to show the procedure to reproduce the object image 401. After S28, the editor program 29 ends the process in FIGS. 3A-3C.

Meanwhile, the image forming apparatus 200 (see FIG. 1) may form the composite image 411 composed of the composite image data in the image-formable format received from the information processing apparatus 100 on the sheet 28 and discharge the sheet 28 with the composite image 411 formed thereon. The user may cut the partial images 406 separately from one another along the linear objects 413 formed on the discharged sheet 28. The user may thereafter arrange the partial images 406 according to the defined order indicated in the ordinal objects 412 to reproduce the object image 401.

Benefits achievable from the editor program 29 according to the first embodiment will be described below. As described above, the composite image 411 includes the first partial images 406A and the second partial images 406B, which are arrayed in the arrangement such that the sides H3 of the first partial images 406A and the sides H4 of the second partial images 406B align along the first direction 9. In this arrangement, when the image is formed on the sheet 28 based on the composite image data in the image-formable format, a blank area in the sheet 28, in which no image is formed, may be reduced. In particular, when the dimensions of the side H3 and the side H4 are equal to the sheet width w1, the blank area in the sheet 28, in which no image is formed, may be reduced more efficiently.

Further, the user is allowed to choose the reference point for the defining process between the origin point P0 and the vertex P3. Therefore, the user may choose the arrangement how the object 401 may be divided.

Further, the composite image 411 has the linear objects 413; therefore, the user may cut the sheet 28, on which the images based on the composite image data are formed, into the smaller pieces easily and correctly.

Further, the composite image 411 has the ordinal objects 412. Therefore, the user may easily reproduce the object image 401 from the sheet 28, on which the images based on the composite image data are formed. The order indicated by the ordinal objects 412 indicates the correspondence between the orientation of the object image 401 and the orientations of the first and second partial images 406A-406B. Therefore, the user may reproduce the object image 401 from the sheet 28, on which the images based on the composite image data unit are formed, even more easily.

Further, the editor program 29 controls the guidance image 420 to be displayed in the display 15. Therefore, the user may reproduce the object image 401 from the sheet 28, on which the images based on the composite image data are formed, even more easily, with the aid of the guidance image 420.

In this paragraph, described is a modified example of the editor program 29. The first embodiment illustrated that, in the object image 401, the size of the first partial images 406A in the widthwise direction 9A is equal to the predetermined length, and the size of the first partial images 406A in the lengthwise direction 8A is equal to the size of the object image 401 in the lengthwise direction 8A. Meanwhile, the size of the second partial images 406 in in the widthwise direction 9A is smaller than the predetermined length, and the size of the second partial images 406B in the lengthwise direction 8A is equal to the predetermined length, in the composite image 401. However, the first through third partial images may not necessarily be defined in the arrangement as illustrated above. For example, first through third partial images 406D-40F may be defined in an arrangement as shown in FIG. 7A. Namely, the size of the first partial images 406D in the widthwise direction 9A may be equal to the size of the object image 401 in the widthwise direction 9A, and the size of the first partial images 406D in the lengthwise direction 8A may be equal to the predetermined length. The size of the second partial images 406E in the widthwise direction 9A may be equal to the predetermined length, and the size of the second partial images 406E in the lengthwise direction 8A may be smaller than the predetermined length. The third partial image 406F is a remainder of the object image 401 after the first partial images 406D and the second partial images 406E are subtracted from the object image 401. Based on the arrangement of the partial images 406 in FIG. 7A, the editor program 29 may generate the composite image data 410 to compose the composite image 411 as shown in FIG. 7B. The first partial images 406D and the second partial images 406E are arrayed in the composite image 411 in an arrangement such that the sides H3 of the first partial images 406D and the sides H4 of the second partial images 406E extend along the second direction 8, or the lengthwise direction 8B.

Next, in the following paragraphs, a second embodiment of the editor program 29 will be described with reference to FIGS. 8A-8C through 11A-11B. In the description of the second embodiment, structures, parts, or items that are identical or similar to those in the first embodiment may be referred to by a same reference sign, and redundant explanation of those will be omitted.

After conducting S1 and S2, in S31, the editor program 29 generates a unit of displayable data to compose an object-image displaying screen 32A (see FIG. 9A) based on the focused image data 400 having been read. Further, the editor program 29 controls the display 15 to display the object-image displaying screen 32A based on the generated displayable data.

The object-image displaying screen 32A shown in FIG. 9A may differ from the object-image displaying screen 32 according to the first embodiment shown in FIG. 4A in that the object-image displaying screen 32A does not contain the setting button 114. However, the object-image displaying screen 32A may contain the setting button 114. In response to receiving of the user's operation to the start button 113 in S31 (see FIG. 8A), in S32, the editor program 29 sets the counter at 1 being the initial value.

In S33, the editor program 29 defines pixel information set(s) 405A corresponding to one or more first partial image(s) 407A based on the size information 404 and the predetermined length (see FIG. 9C) and conducts the assigning process to the defined pixel information set(s) 405A. The process in S33 may be performed similarly to the process in S9-S11 in FIG. 3A.

If undefined unit(s) of pixel information 405 remains in the focused image data 400, in S34, the editor program 29 defines the remaining unit(s) of pixel information 405 as a pixel information set 405A corresponding to a last one of the first partial images 407A (see FIG. 9C), or as a pixel information set 405A. Further, in S34, the editor program 29 conducts the assigning process to the defined pixel information set 405A. The first partial images 407A defined in S33, S34 have the sides H5 extending along the lengthwise direction 8A, and the size of the sides H5 is equal to the size of the side H12 of the focused objet image 401 extending along the lengthwise direction 8A. The size of the side H3 of the last one of the first partial images 407A defined lastly in S34 in the widthwise direction 9A is smaller than the size of the sides H3 of the other first partial images 407A defined in S33.

In S35, the editor program 29 generates a unit of composite image data to compose a composite image 431A shown in FIG. 9D. The composite image 431A differs from the composite image 411 shown in FIG. 5B in that the first partial images 407A are arrayed in an arrangement such that the sides H3 extend along the first direction 9, or the widthwise direction 9B.

In S36, the editor program sets the counter at 1 being the initial value.

In S37, the editor program 29 defines pixel information set(s) 405B corresponding to one or more second partial image(s) 407B among the entire units of pixel information 405 in the focused image data 400 based on the size information 404 and the predetermined length (see FIG. 10A). This act of the editor program 29 may be similarly conducted as the process describe above with reference to FIG. 7A, and the second partial images 407 shown in FIG. 10A may have the same shape as the first partial images 406D (see FIG. 7A). In 37, the editor program 29 conducts the assigning process to the defined pixel information sets 405B.

If undefined unit(s) of pixel information 405 remains in the focused image data 400, in S38, the editor program 29 defines the remaining unit(s) of pixel information 405 as a pixel information set 405B corresponding to a last one of the second partial image 407B (see FIG. 10A), or as a pixel information set 405B. Further, in S38, the editor program 29 conducts the assigning process to the defined pixel information set 405B. The second partial images 407B defined in S37, S38 have the sides H6 extending along the widthwise direction 9A, and the size of the sides H6 is equal to the size of the side H11 of the focused image 401 extending along the widthwise direction 9A. Meanwhile, a size of the side of the last one of the second partial images 407B define in S38 in the lengthwise direction 8A is smaller than the size of the side of the other second partial images 407B defined in S37.

In S39, the editor program 29 generates a unit of composite image data to compose a composite image 431B shown in FIG. 10B. The composite image 431B differs from the composite image 411 shown in FIG. 7B in that the second partial images 407B are arrayed in an arrangement such that the sides H6 extend along the second direction 8, or the lengthwise direction 8B.

In S40, the editor program 29 generates displayable data to compose a preview screen 34A (see FIG. 9B) based on the composite image data generated in S39. Further, the editor program 29 controls the display 15 to display the preview screen 34A based on the generated displayable data.

As shown in FIG. 9B, the preview screen 34A includes images resize from the composite images 431A, 431B, which are presented as options for the image forming. The preview screen 34A includes a first button 118A and a second button 18B being designative objects that may be designated by the user's operation. The user may designate one of the first button 118A and the second button 118B through the user I/F 14 to select the image to be formed between the composite image 431A and the composite image 431B. In S40, further, the editor program 29 may receive the user's operation to designate one of the first button 118A and the second button 118B.

In S41, the editor program 29 selects one of the composite images 431A, 431B corresponding to the user's designating operation. In other words, the editor program 29 may select either the first partial images 407A or the second partial images 407B. In S42, the editor program 29 converts the one of the composite images 431A, 431B selected in S41 into a unit of composite image data in the image-formable format and outputs the composite image data in the image-formable format to the OS 28 so that the composite image data in the image-formable format may be transmitted to the image forming apparatus 200. In S43, the editor program 29 controls the display 15 to display a guidance image. The guidance image may show a procedure to reproduce the object image 401 from the first partial images 407A or the second partial images 431B composed of the composite image 431A or the composite image 431B selected in S41. Thereafter, the editor program 29 ends the process in FIG. 8A.

According to the second embodiment, the editor program 29 may define the first partial images 407A and the second partial images 407B and generate the composite image data. The editor program 29 may convert the composite image data selected by the user's operation into the composite image data in the image-formable format. Based on the composite image data in the image-formable format, when the image forming apparatus 200 forms the image on the sheet 28, blank areas, in which no image is formed, on the sheet 28 may be reduced.

Moreover, the dimension of the sides H5 of the first partial images 407A is equal to the dimension of the object image 401 in the lengthwise direction 8A, and the dimension of the side H6 of the second partial images 407B is equal to the dimension of the object image 401 in the widthwise direction 9A. In this arrangement, a quantity of the first partial images 407A and the second partial images 407B may be reduced. In other words, a quantity of pieces, into which the sheet 28 may be divided, may be reduced.

Moreover, the editor program 29 may select either the composite image 431A or the composite image 431B according to the user's operation in S41. Therefore, the image forming apparatus 200 may form the user's preferred image on the sheet 28.

In the following paragraphs, described are modified examples of the second embodiment. The second embodiment illustrated that, the editor program 29 may select either the composite image 431A or the composite image 431B according to the user's operation in S41. However, the editor program 29 may not necessarily select the composite image to be used for image forming according to the user's operation but may select the composite image to be used automatically based on criteria described below as first and second examples.

According to the first example, following the steps S1-S39 shown in FIG. 8A, the editor program 29 may conduct S51, S52 as shown in FIG. 8B in place of S40, S41.

In particular, in S51, the editor program 29 may count a total quantity T1A of the first partial images 407A defined in S33, S34 and a total quantity T2B of the second partial images 407B defined in S37, S38. Next, the editor program 29 may select one of the composite images 431A, 431B, in other words, one of the first partial images 407A and the second images 407B, depending on the total quantities T1A, T1B. For example, when the total quantity T1A is smaller than the total quantity T1B, the editor program 29 may select the composite image 431A. When the total quantity T1B is smaller than the total quantity T1A, on the other hand, the editor program 29 may select the composite image 431B. Thereafter, the editor program 29 may conduct S42 and onward. In this procedure, the user may reproduce the object image 401 with one of the first composite image 431A and the second composite image 431B formed on the divided pieces of the sheet 28 in a smaller number of steps.

According to the second example, following the steps S1-S39 shown in FIG. 8A, the editor program 29 may conduct S53, S54 as shown in FIG. 8C in place of S40, S41. In particular, as shown in FIG. 8C, in S53, the editor program 29 may determine area dimension S1A of the last one of the first partial images 407A defined in S34 and may determine area dimension S1B of the last one of the second partial images 407B lastly defined in S38. The area dimensions S1A, S1B may correspond to quantities of the pixels included in the pixel information sets 405A, 405B, respectively. The area dimension S1A is a dimension of a smallest area among the areas of the plurality of first partial images 407A defined in S33-S34, and the area dimension S1B is dimensions of a smallest area among the areas of the plurality of second partial images defined in S37-S38. In S54, the editor program 29 may select one of the composite images 431A, 431B, in other words, one of the first partial images 407A and the second partial images 407B. For example, when the area dimension S1A is greater than the area dimension S1B, the editor program 29 may select the composite image 431A. When the area dimension S1B is greater than the area dimension S1A, on the other hand, the editor program 29 may select the composite image 431B. Thereafter, the editor program 29 may conduct S42 and onward. In this procedure, the user may easily reproduce the object image 401 with one of the first composite images 431A and the second composite images 431B formed on the divided pieces of the sheet 28.

A third modified example of the second embodiment will be described in the following paragraphs. As shown in FIG. 2A, the image-formable area 28A may include margins 2B. The margins 2B include an area between a position P1 and one of the two (2) sides extending along the lengthwise direction 5 and an area between a position P2 and the other of the two (2) sides extending along the lengthwise direction in the image-formable area 28A. In other words, the image-formable area 28A include the margins 2B along inner edges thereof. The positions P1, P2 are located to be spaced apart for a predetermined distance w2 from the one and the other of the sides extending along the lengthwise direction 5, respectively, toward a widthwise center of the sheet 28. When the composite images 431A, 431B (see FIGS. 9D and 10B) have the same dimension in the widthwise direction 9B as the sheet width w1, no image may be formed on the sheet 28 in areas coincident with the margins 28B. In the third embodiment, the editor program 29 may, following the steps S1-S39 shown in FIG. 8A, conduct S55-S58 as shown in FIG. 10C in place of S40, S41.

In S55, the editor program 29 may conduct a known edge-detecting process to each of the pixel information sets 405A defined in S33, S34. Thereby, the editor program 29 may identify the pixel information sets 405A corresponding to the parts of the objects 402 (see FIG. 11A) in the first partial images 407A and define as object-pixel information sets 408A. Moreover, the editor program 29 may conduct the edge-detecting process to each of the pixel information sets 405B defined in S37, S38 likewise. Thereby, the editor program 29 may identify the pixel information sets 405B corresponding to the parts of the objects 402 (see FIG. 11B) in the second partial images 407B and define as object-pixel information sets 408B.

In S56, the editor program 29 may obtain the predetermined distance w2 preset in the data storage area 12B. Optionally, the predetermined distance w2 may be preset within the editor program 29. In S56, further, the editor program 29 may define pixel areas 409A, 409B overlapping the margins 28B corresponding to the predetermined distance w2. Next, in S57, the editor program 29 may count a quantity of the pixels contained in the pixel area 409A, which is indicated by hatching in FIG. 11A, for each of the object-pixel information sets 408A, and calculate a sum T2A of the counted quantity of the pixels. Further, the editor program 29 may count a quantity of the pixels contained in the pixel area 409B, which is indicated by hatching in FIG. 11B, for each of the object-pixel information sets 408B, and calculate a sum T2B of the counted quantity of the pixels. The sums T2A, T2B indicate a sum of areas, in which the objects 402 overlap the pixel areas 409A in the first partial images 407A, and a sum of areas, in which the objects 402 overlap the pixel areas 409B in the second partial images 407B, respectively.

In S58, the editor program 29 may select one of the composite images 431A, 431B, in other words, one of the first partial images 407A and the second partial images 407B, according to the sums T2A, T2B. For example, when the sum T2A is smaller than the sum T2B, the editor program 29 may select the composite image 431A; or when the sum t2B is smaller than the sum T2A, the editor program 29 may select the composite image 431B. According to this procedure, one of the composite images 431A, 431B having smaller areas of the objects 402 falling on the margins 28B, where no image may be printed, may be selected, and the user may reproduce the object image 401 more finely with the one of the first composite image 431A and the second composite image 431B formed on the divided pieces of the sheet 28.

Although examples of carrying out the invention has been described, those skilled in the art will appreciate that there are numerous variations and permutations of the information processing apparatus and the computer-readable storage medium that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the dimensions of the sides H3, H4 illustrated in the first embodiment may not necessarily equal to the sheet width w1. The dimensions of the sides H3, H4 may be equal to a remainder of the sheet width w1 after the predetermined distance w2 is doubled and subtracted. In this arrangement, the image forming apparatus 200 may form the entire first partial images 406A and the entire second partial images 406B in the area between the margins 28B on the sheet 28. Similarly, the sides H3 of the first partial images 407A and the sides of the second partial images 407B extending along the lengthwise direction 8A in the second embodiment may be equal to a remainder of the sheet width w1 after the predetermined length w2 is doubled and subtracted.

For another example, the user may not necessarily cut the partial images 406 along the linear objects 413 formed on the sheet 28 to separate from one another, but the image forming apparatus 200 may be equipped with a cutter and cut the partial images 406 formed on the sheet 28 separately from one another by the cutter.

What is claimed is:

1. A non-transitory computer-readable storage medium storing computer-readable instructions for an information processing apparatus, the computer-readable instructions, when executed by a processor of the information processing apparatus, causing the information processing apparatus to perform:
   obtaining:
      a width of an image-formable area, in which an image is formable on a sheet, the image-formable area being in a rectangular shape having a first side extending along a first direction and a second side extending along a second direction, the second direction intersecting orthogonally with the first direction, the width being a size of the first side; and
      object image data composing an object image containing an object, the object image having a size larger than the width in a widthwise direction corresponding to the first direction and in a lengthwise direction corresponding to the second direction;
   defining a first partial image and a second partial image in the object image, the first partial image and the second partial image each having a rectangular shape, the first partial image having a third side, the third side extending along the widthwise direction, a size of the third side being at most equal to the width, the second partial image having a fourth side, the fourth side extending along the lengthwise direction, a size of the fourth side being at most equal to the width; and
   generating composite image data composing an image, in which the first partial image and the second partial image are arrayed in an arrangement such that the third side of the first partial image and the fourth side of the second partial image align along the first direction.

2. The non-transitory computer readable storage medium according to claim 1,
   wherein the computer-readable instructions, when executed by the processor, for defining the first partial image and the second partial image, cause the information processing apparatus to define the first partial image having the size of the third side being equal to the width and the second partial image having the size of the fourth side being equal to the width.

3. The non-transitory computer readable storage medium according to claim 1,
   wherein the computer-readable instructions, when executed by the processor, cause the information processing apparatus to perform, in response to an operation through a user interface of the information processing apparatus, further obtaining reference information indicating a reference point for defining the first partial image and the second partial image in the object image, the reference point being one of one end and the other end of the object image in the widthwise direction; and
   wherein the computer-readable instructions, when executed by the processor, for defining the first partial image and the second partial image in the object image, cause the information processing apparatus to:
when the obtained reference information indicates the reference point being the one end of the object image in the widthwise direction, define the first partial image including the one end of the object image in the widthwise direction and the second partial image including the other end of the object image in the widthwise direction; but
when the obtained reference information indicates the reference point being the other end of the object image in the widthwise direction, define the first partial image including the other end of the object image in the widthwise direction and the second partial image including the one end of the object image in the widthwise direction.

4. The non-transitory computer readable storage medium according to claim 1,
wherein the computer-readable instructions, when executed by the processor, cause the information processing apparatus to perform controlling a display of the information processing apparatus to display a preview image including the image composed of the composite image data.

5. The non-transitory computer readable storage medium according to claim 1,
wherein the computer-readable instructions, when executed by the processor, cause the information processing apparatus to generate the composite image data composing the image, in which a linear object is arranged on an edge of the first partial image and on an edge of the second partial image.

6. The non-transitory computer readable storage medium according to claim 1,
wherein the computer-readable instructions, when executed by the processor, cause the information processing apparatus to generate the composite image data composing the image, in which ordinal objects indicating an order to arrange the first partial image and the second partial image are arranged.

7. The non-transitory computer readable storage medium according to claim 6,
wherein the ordinal objects indicate correspondence between an orientation of the object image and orientations of the first partial image and the second partial image.

8. The non-transitory computer readable storage medium according to claim 1,
wherein the computer-readable instructions, when executed by the processor, cause the information processing apparatus to perform controlling a display of the information processing apparatus to display a guidance image, the guidance image showing a procedure to reproduce the object image from the first partial image and the second partial image.

9. The non-transitory computer readable storage medium according to claim 1,
wherein the sheet includes a margin, in which no image is formable, along an inner edge thereof, and
wherein the computer-readable instructions, when executed by the processor, for obtaining the width of the image-formable area, cause the information processing apparatus to obtain a remainder as the width, the remainder being a size after subtracting a size of the margin from the size of the first side.

10. The non-transitory computer readable storage medium according to claim 1,
wherein the size of the first side of the image-formable area is fixed, and a size of the second side of the image-formable area is unfixed.

11. The non-transitory computer readable storage medium according to claim 1,
wherein the sheet is configured to be conveyed in an image forming apparatus in a conveying direction corresponding to the first direction, the image forming apparatus being configured to form an image based on the composite image data on the sheet; and
wherein the computer-readable instructions, when executed by the processor, for obtaining the width of the image-formable area, cause the information processing apparatus to obtain a size at most equal to a size of the sheet in an orthogonal direction as the width, the orthogonal direction intersecting orthogonally with the conveying direction.

12. A non-transitory computer-readable storage medium storing computer-readable instructions for an information processing apparatus, the computer-readable instructions, when executed by a processor of the information processing apparatus, causing the information processing apparatus to perform:
obtaining:
a width of an image-formable area, in which an image is formable on a sheet, the image-formable area being in a rectangular shape having a first side extending along a first direction and a second side extending along a second direction, the second direction intersecting orthogonally with the first direction, the width being a size of the first side; and
object image data composing an object image containing an object, the object image having a size larger than the width in a widthwise direction corresponding to the first direction and in a lengthwise direction corresponding to the second direction;
defining a plurality of first partial images in the object image, each of the plurality of first partial images having a rectangular shape and having a third side, the third side extending along the widthwise direction, a size of the third side being at most equal to the width;
defining a plurality of second partial images in the object image, each of the plurality of second partial images having a rectangular shape and having a fourth side, the fourth side extending along the lengthwise direction, a size of the fourth side being at most equal to the width;
selecting one of the plurality of first partial images and the plurality of second partial images; and
outputting one of first composite image data composing a first image corresponding to the plurality of first partial images and second composite image data composing a second image corresponding to the plurality of second partial images based on the selection between the plurality of first partial images and the plurality of second partial images.

13. The non-transitory computer storage medium according to claim 12,
wherein the computer-readable instructions, when executed by the processor, cause the information processing apparatus to generate:
when the plurality of first partial images is selected, the first composite image data composing the first image, in which the plurality of first partial images are arrayed in an arrangement such that the third side of each of the plurality of first partial image aligns along the first direction; but when the plurality of second partial images is selected, the second composite image data composing the second image, in which the plurality of second partial images are arrayed in an arrangement such that the fourth side of each of the plurality of second partial image aligns along the first direction.

14. The non-transitory computer storage medium according to claim 12,
    wherein each of the plurality of first partial images has a fifth side, the fifth side extending along the lengthwise direction, a size of the fifth side being equal to the size of the object image in the lengthwise direction;
    wherein each of the plurality of second partial images has a sixth side, the sixth side extending along the widthwise direction, a size of the sixth side being equal to the size of the object image in the widthwise direction.

15. The non-transitory computer storage medium according to claim 12,
    wherein the information processing apparatus comprises a display and a user interface;
    wherein the computer-readable instructions, when executed by the processor, further cause the information processing apparatus to perform controlling the display to display:
        the plurality of first partial images;
        the plurality of second partial images; and
        a designative object, through which one of the plurality of first partial images and the plurality of second partial images is designative; and
    wherein the computer-readable instructions, when executed by the processor, and in response to receiving of an operation to the designative object through user interface, cause the information processing apparatus to select the designated one of the plurality of first partial images and the plurality of second partial images.

16. The non-transitory computer storage medium according to claim 12,
    wherein the computer-readable instructions, when executed by the processor, for selecting the one of the plurality of first partial images and the plurality of second partial images, cause the information processing apparatus to:
        count quantities of the plurality of first partial images and the plurality of second partial images; and
        select one of the plurality of first partial images and the plurality of second partial images, of which quantity is smaller.

17. The non-transitory computer storage medium according to claim 12,
    wherein the computer-readable instructions, when executed by the processor, for selecting the one of the plurality of first partial images and the plurality of second partial images, cause the information processing apparatus to:
        calculate an area dimension of each of the plurality of first partial images and the plurality of second partial images; and
        select one of the plurality of first partial images and the plurality of second partial images including a larger one of partial images between a partial image, of which area dimension is smallest among the plurality of first partial images, and a partial image, of which area dimension is smallest among the plurality of second partial images.

18. The non-transitory computer storage medium according to claim 12,
    wherein the sheet includes a margin, in which no image is formable, along an inner edge thereof; and
    wherein the computer-readable instructions, when executed by the processor, for selecting the one of the plurality of first partial images and the plurality of second partial images, cause the information processing apparatus to:
        calculate a sum of dimensions of areas, in which the object overlaps an area corresponding to the margin in each of the plurality of first partial images, and a sum of dimensions of areas, in which the object overlaps an area corresponding to the margin in each of the plurality of second partial images; and
        select one of the plurality of first partial images and the plurality of second partial images, of which sum of the dimensions is smaller.

19. An information processing apparatus, comprising:
    a communication interface; and
    a controller configured to:
        obtain:
            a width of an image-formable area, in which an image is formable on a sheet, the image-formable area being in a rectangular shape having a first side extending along a first direction and a second side extending along a second direction, the second direction intersecting orthogonally with the first direction, the width being a size of the first side; and
            object image data composing an object image containing an object, the object image having a size larger than the width in a widthwise direction corresponding to the first direction and in a lengthwise direction corresponding to the second direction;
        define a first partial image and a second partial image in the object image, the first partial image and the second partial image each having a rectangular shape, the first partial image having a third side, the third side extending along the widthwise direction, a size of the third side being at most equal to the width, the second partial image having a fourth side, the fourth side extending along the lengthwise direction, a size of the fourth side being at most equal to the width;
        generate composite image data composing an image, in which the first partial image and the second partial image are arrayed in an arrangement such that the third side of the first partial image and the fourth side of the second partial image align along the first direction; and
        transmit a command to execute image-forming based on the composite image externally through the communication interface.

20. An information processing apparatus, comprising:
    a communication interface; and
    a controller configured to:
        obtain:
            a width of an image-formable area, in which an image is formable on a sheet, the image-formable area being in a rectangular shape having a first side extending along a first direction and a second side extending along a second direction, the second direction intersecting orthogonally with the first direction, the width being a size of the first side; and
            object image data composing an object image containing an object, the object image having a size larger than the width in a widthwise direction corresponding to the first direction and in a lengthwise direction corresponding to the second direction;

define a plurality of first partial images in the object image, each of the plurality of first partial images having a rectangular shape and having a third side, the third side extending along the widthwise direction, a size of the third side being at most equal to the width;

define a plurality of second partial images in the object image, each of the plurality of second partial images having a rectangular shape and having a fourth side, the fourth side extending along the lengthwise direction, a size of the fourth side being at most equal to the width;

select one of the plurality of first partial images and the plurality of second partial images;

output one of first composite image data composing a first image corresponding to the plurality of first partial images and second composite image data composing a second image corresponding to the plurality of second partial images based on the selection between the plurality of first partial images and the plurality of second partial images; and transmit a command to execute image-forming based on the selected one of the first composite image data and the second composite image data externally through the communication interface.

21. The information processing apparatus according to claim 20, wherein the controller is configured to:

when the controller selects the plurality of first partial images, generate the first composite image data composing the first image, in which the plurality of first partial images are arrayed in an arrangement such that the third side of each of the plurality of first partial image aligns along the first direction; but when the controller selects the plurality of second partial images, generate the second composite image data composing the second image, in which the plurality of second partial images are arrayed in an arrangement such that the fourth side of each of the plurality of second partial image aligns along the first direction.

* * * * *